United States Patent [19]

Wilson, Jr.

[11] Patent Number: 5,221,924
[45] Date of Patent: Jun. 22, 1993

[54] WIND SHEAR ALERT SYSTEM

[75] Inventor: F. Wesley Wilson, Jr., Longmont, Colo.

[73] Assignee: University Corporation for Atmospheric Research, Boulder, Colo.

[21] Appl. No.: 694,455

[22] Filed: May 1, 1991

Related U.S. Application Data

[63] Continuation of Ser. No. 419,215, Oct. 11, 1989, abandoned.

[51] Int. Cl.$^5$ .............................................. G08B 23/00
[52] U.S. Cl. ................................ 340/968; 73/170.11; 340/949; 342/26; 364/434
[58] Field of Search ............... 340/949, 963, 968, 967; 73/178 T, 189; 364/434, 427, 428; 342/26; 244/191

[56] References Cited

U.S. PATENT DOCUMENTS

| | | | |
|---|---|---|---|
| 4,295,139 | 10/1981 | Arpino | 340/949 |
| 4,318,076 | 3/1982 | Whitfield | 340/949 |
| 4,725,811 | 2/1988 | Muller et al. | 340/963 |
| 4,812,844 | 3/1989 | Kallstrom | 340/968 |
| 4,857,922 | 8/1989 | Miller et al. | 340/968 |

OTHER PUBLICATIONS

The Federal Triangle, "FAA Plans to Buy Wind-Shear Alert Devices", Washington Post, Oct. 17, 1983.

U.S. DOT FAA Report FAA-E-2697A, Mar. 6, 1989, "Low Level Wind Shear Alert System".

NCAR, "Enhanced LLWAS Algorithms", Jun. 28, 1988 Wilson Jr. and Cornman.

*Primary Examiner*—Brent A. Swarthout
*Attorney, Agent, or Firm*—Duft, Graziano & Forest

[57] ABSTRACT

A wind shear alert system for low level horizontal wind shears is disclosed. The wind shear alert system is based upon a network of remote sensor stations placed near runways throughout the geographic area covered by an airport. An airport configuration file supplies numerous parameters related to the geometry and geography of the airport, as well as threshold values for divergence phenomena in the form of microbursts. Selected pairs, edges, and triples, triangles, of said network are monitored specifically to detect a divergence. Data from the various remote sensor stations is filtered to remove short term effects and adjust for missing data. A network mean is computed to which wind field measurement data and divergence analysis is compared. If a divergence in the form of a microburst or generic wind shear is detected, then the relative magnitude of the loss or gain in head wind to approaching aircraft is determined, as well as the location of the head wind. Alarm messages are issued to air traffic controller display screens which are then relayed to the pilot of an arriving or departing aircraft.

21 Claims, 3 Drawing Sheets

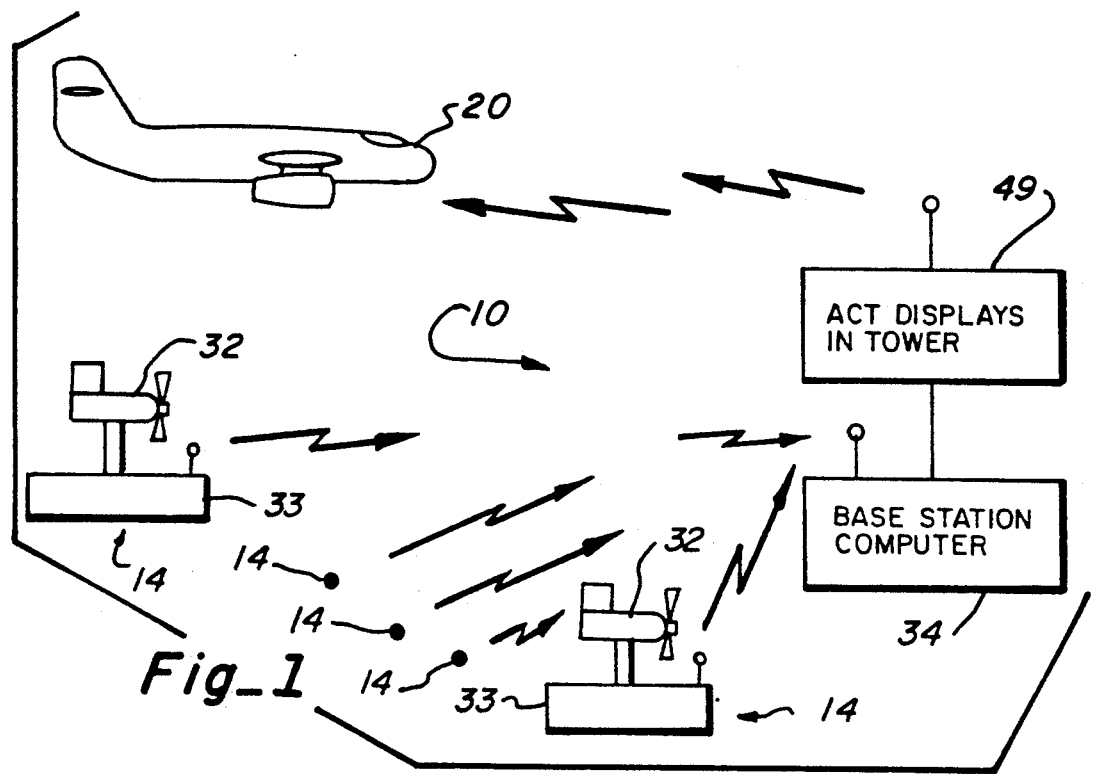
Fig_1
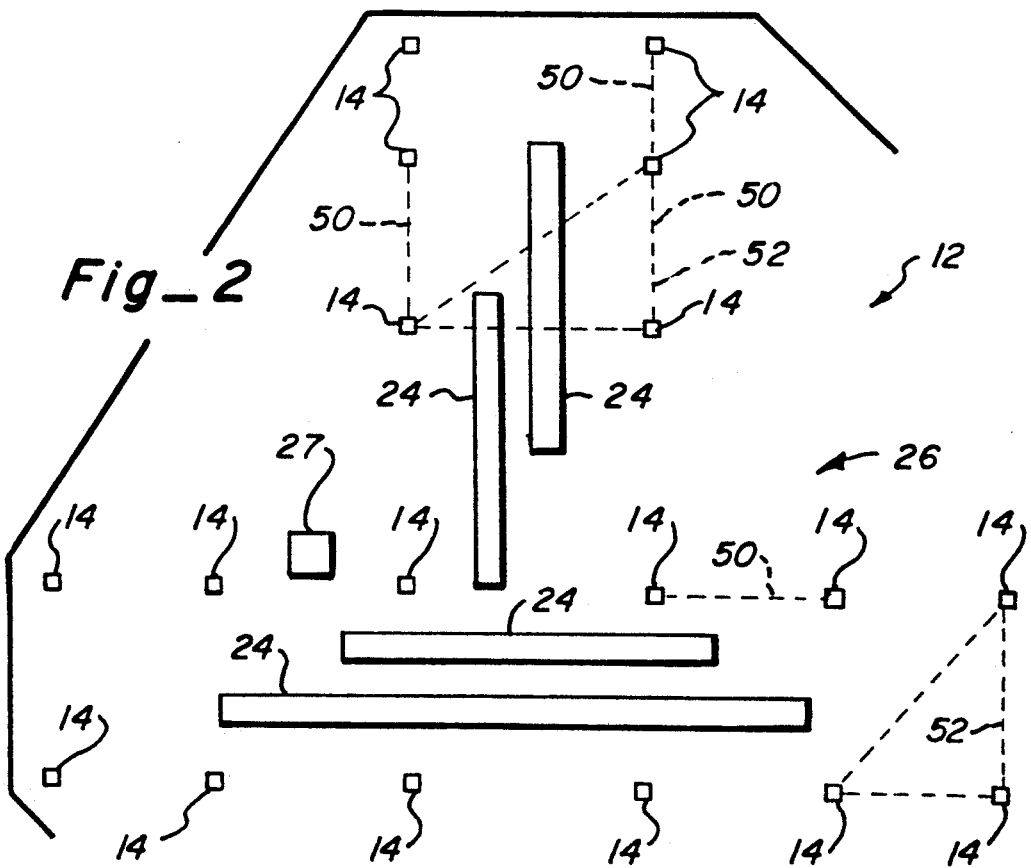
Fig_2

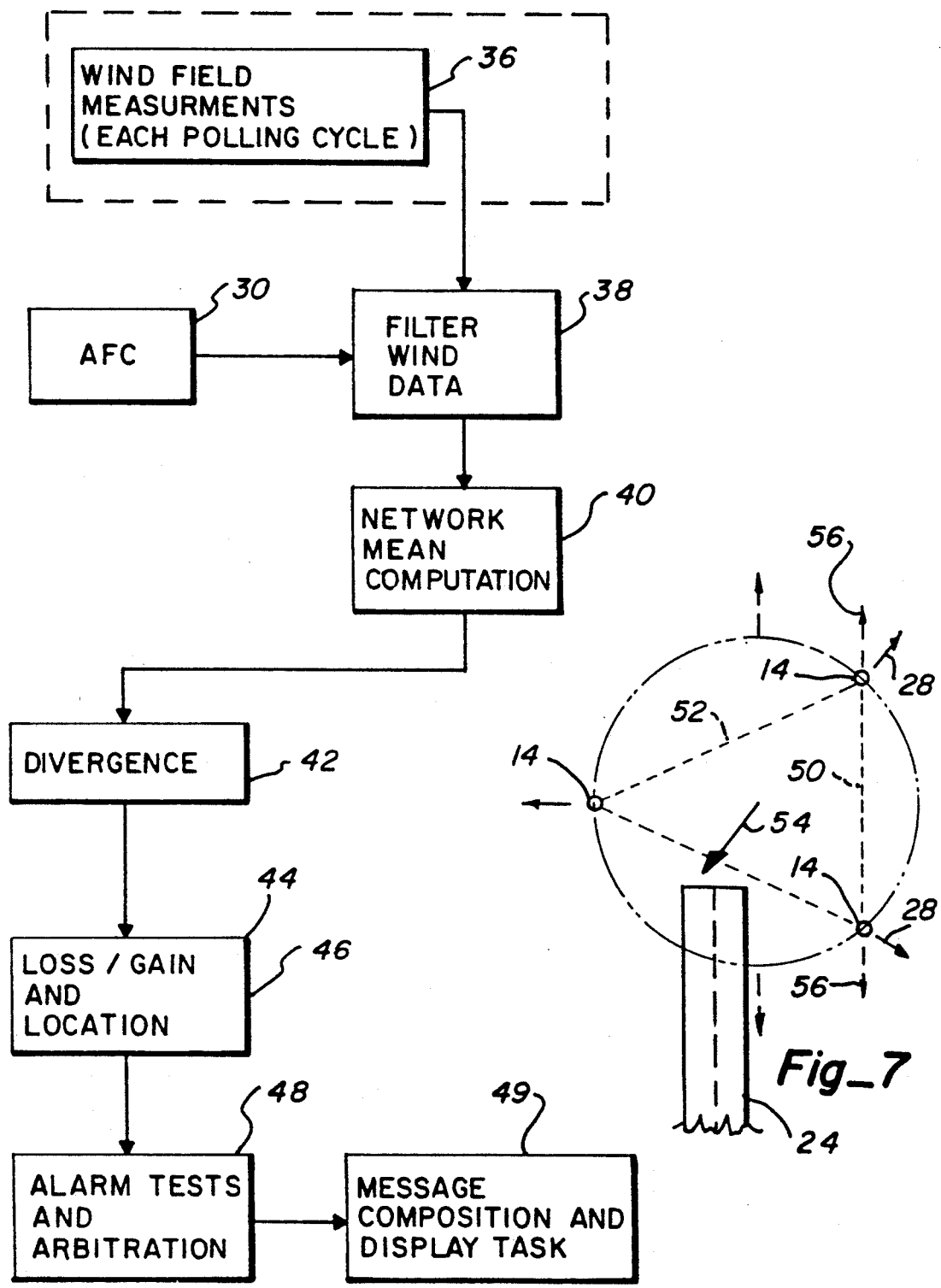
Fig_3
Fig_7

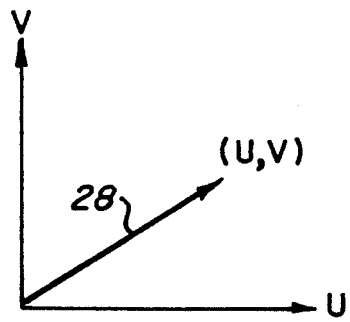
Fig_4
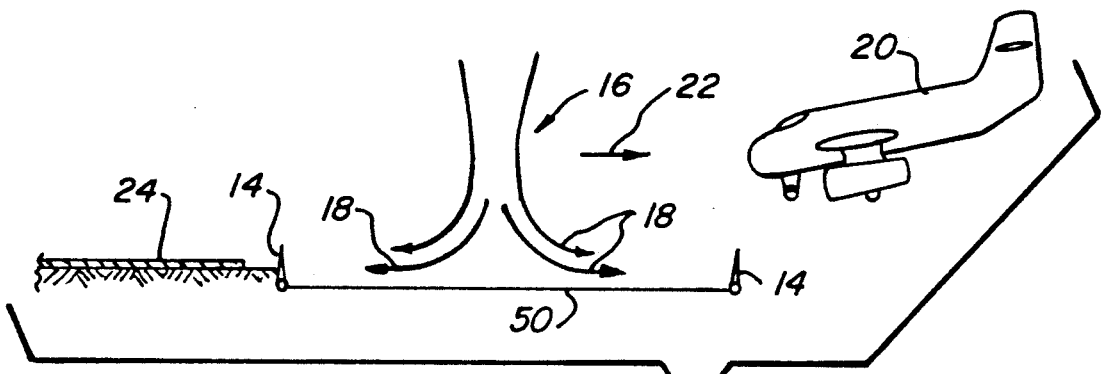
Fig_5
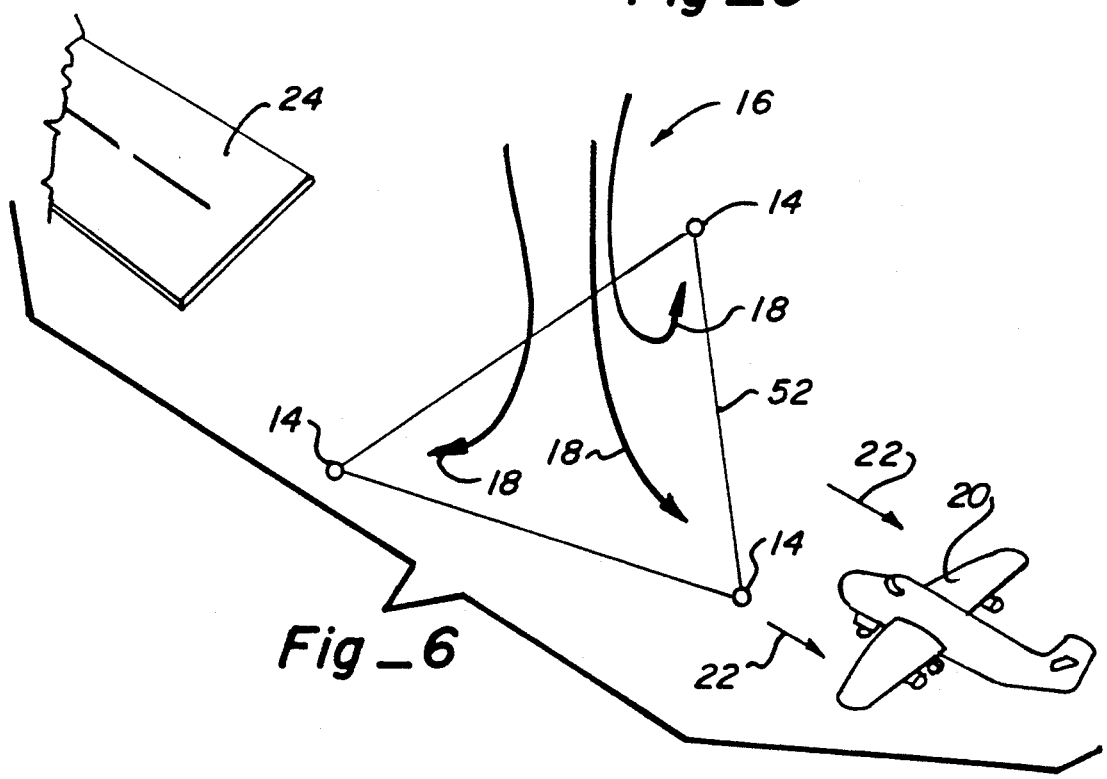
Fig_6

WIND SHEAR ALERT SYSTEM

GOVERNMENT FUNDED INVENTION

This invention described in this application was made with Government support and the Government has certain rights in the invention.

This is a continuation application Ser. No. 07/419,215, filed Oct. 11, 1989, and now abandoned.

BACKGROUND OF THE INVENTION

1. Field of the Invention

The present invention relates generally to methods for detecting horizontal wind shear within a geographic location of an airport bounded by a network of sensors located at specific locations. More particularly, the invention relates to wind shear detection systems Which incorporate a network of anemometers to sense wind velocity, speed and direction, near the airport.

2. Description of the Prior Art

The Federal Aviation Administration (FAA) has previously deployed a Low Level Wind Shear Alert System (LLWAS). The LLWAS used sensors or anemometers on towers located at specific locations about an airport. The anemometers measured wind velocity. The original LLWAS system gave information to the air traffic controllers, which information was relayed by radio to the pilot of an arriving or departing aircraft.

The original LLWAS system used a vector difference algorithm to detect horizontal wind shear, i.e., wind shears which affected head wind relative to an aircraft. The LLWAS system issued general area messages about wind shear and was not geographic specific within the wind field about the airport. A wind field is made up of wind velocity vectors for each sensor station over the geographic area in which a network of sensors is established. The LLWAS did not issue runway specific messages and did not estimate the intensity of the wind shear hazard.

A follow-up system to LLWAS, called a Phase II system, has been developed by the FAA to upgrade LLWAS. The Phase II system uses the same anemometers to provide wind velocity and direction data. The Phase II system is partially adapted to handle data noise. The Phase II system has a limited ability to detect wind field divergence, a derived value based on spacial derivatives of the wind field. Specifically, a positive divergence might indicate a microburst wind shear, or a less intense wind shear. Divergence is associated with a loss of head wind, and resulting loss of aircraft performance on takeoff or landing.

Even though the Phase II system attempts to detect wind field divergence, neither LLWAS nor the Phase II system is capable of issuing microburst alarms, as differentiated from any other wind shear. The Phase II system does not give runway specific information about the intensity or location of any wind shear, other than a general regional statement. The Phase II system is the wind shear alert system operating throughout the United States at the present time.

Both the original LLWAS and the Phase II system use the same basic approach. Anemometer data is gathered and processed for the network. A simple wind shear alert, without differentiating between a microburst and other wind shear, is given for a general location. The locations are directional, i.e., north or east. The magnitude of the wind shear hazard, i.e., whether a microburst is present, and its location are not addressed in the prior systems.

SUMMARY OF THE INVENTION

Remote sensor stations spaced at specific locations about an airport location have tower mounted anemometers for sensing wind velocity, speed and direction. A wind velocity representation is transmitted to a base station computer which stores U and V values, expressed in meters per second. The U and V values, coordinates of a Cartesian coordinate system, are representative of a wind velocity vector at each sensor station location.

The wind shear alert system processes the wind velocity measurements over the wind field, wind field measurements, which are stored as the wind velocity vectors U and V, to detect wind shear. Wind velocity data for all the sensor stations, and preselected parameters from an airport configuration file, are combined and presented to the air traffic controller as runway specific alphanumeric messages concerning microbursts and wind shear alerts.

The first step in the wind shear alert system process is to enhance data quality. Missing data are adjusted for both long term and intermittent gaps. Various filtering techniques are applied to the wind field measurement data to suppress short term variations and localized meteorological variation. Data availability flags are set and used to guide the analysis of the remainder of the steps of the system process.

A robust network mean estimate is computed using data trimming and temporal averaging. The network mean computation yields an estimate of the mean wind field vector, or ambient wind, and the noise level in the data. The mean wind field vector is used to detect evidence of wind shear beyond the network. The noise level in the data is used to adjust thresholds to adapt to volatile wind conditions.

A divergence analysis is used to detect primary wind shear hazards, microbursts and gust fronts. Microbursts are characterized by positive wind field divergence. Gust fronts show strong negative divergence or convergence.

The divergence analysis is based on a family of edges and triangles whose vertices are at selected sensor stations. An edge is a line segment that joins a pair of closely positioned sensor stations, typically 1.5 to 5.5 Km. A triangle is formed by a triple of closely positions sensor stations. A numerical derivative technique is used to measure the divergence on each edge and triangle. If a divergence is detected, then a microburst head wind loss estimate is generated, based on a simplified symmetric microburst model. This information is the basis for a microburst alert message.

If a weaker divergence or a convergence is detected, then the runway oriented head wind loss and gain are computed for each runway. Wind vector components parallel to the runway are compared to establish the loss or gain for each runway. A wind shear message is issued for each runway that has a persistent microburst level divergence or a persistent loss or gain in excess of 15 knots. The location of the wind shear along the runway is identified.

The wind shear alert system of the present invention supplies alarms which are transmitted to the air traffic controller at the particular airport. The alarms indicate what type of wind shear is present, Which runways are affected, and which wind shear is most hazardous when multiple wind shears are present. Alert types include a microburst alert (MBA), wind shear alert with head wind loss (WSA/loss), and wind shear alert with head wind gain (WSA/gain). The magnitude of the loss or gain and the location of the wind shear along the runway is computed. An additional test is executed to determine if there is evidence of wind shear beyond the network. This information is then radioed to the pilot of an aircraft using the specific runway.

The message generated as a result of the alarm for each runway therefore includes the information of alert type, gain or loss value, loss being a negative, and shear location, given a value of 0, 1, 2 or 3. The shear location values indicate nautical miles from the threshold end of the runway, 0 being on the runway, 1 being within one mile of the runway, 2 being between one and two miles of the runway and 3 indicating wind shear between two and three miles off the end of the runway. Messages are issued for each arrival runway and for each departure runway.

Other aspects, features and details of the present invention can be more completely understood by reference of the following detailed description of a preferred embodiment, taken in conjunction with the drawings, and from the appended claims.

BRIEF DESCRIPTION OF THE DRAWINGS

FIG. 1 is a schematic illustration of components of a wind shear alert system in accordance with the present invention.

FIG. 2 is a schematic plan view of runways of an airport employing the wind shear alert system illustrating an exemplary location of some of the components shown in FIG. 1.

FIG. 3 is a flow chart showing the steps of the process of the wind shear alert system in accordance with the invention.

FIG. 4 is an illustration of a Cartesian coordinate system showing a wind vector at a sensor station employed in the system shown in FIG. 3.

FIG. 5 is a schematic elevation illustration of a microburst and a pair of sensor stations, defining an edge, along a runway, an aircraft shown on final approach to a runway of an airport such as shown in FIG. 2.

FIG. 6 is a perspective illustration of a microburst and three sensor stations, defining a triangle, and an aircraft shown on final approach to a runway of an airport such as shown in FIG. 2.

FIG. 7 is a plan illustration of a runway and triangle showing the physical relationship in detecting a microburst head wind loss and a runway oriented head wind loss using the system shown in FIG. 1.

DESCRIPTION OF THE PREFERRED EMBODIMENT

The present invention detects horizontal wind shears and particularly detects and differentiates between hazardous wind shears, or microbursts, and other wind shears. Microbursts are downwardly directed air flows, which impact the ground perpendicularly, in which case they are symmetrical as shown in FIG. 5, or obliquely, in which case they are asymmetrical, resulting in a noncongruous wind field near the ground. A microburst typically is one and a half to five kilometers in radius at the ground. Horizontal wind shears 18 (FIGS. 5 and 6) are generated from the ground to an altitude of 1-2 kilometers. These wind shears 18 appear to an aircraft 20 arriving or departing from a runway 24 as a head wind gain or a head wind loss.

As seen in FIGS. 5 and 6, a head wind gain is followed by a head wind loss, after the aircraft 20 passes through or beneath the microburst 16. The change in head wind from a gain to a loss results in a hazardous situation as the pilot of the aircraft 20 may initially bleed off airspeed as a head wind gain is encountered and then must increase airspeed, as he experiences a head wind loss, in order to avoid stalling the aircraft 20. The situation is aggravated by the fact that the aircraft 20 is either on final approach or just departing the runway 24 at an airport 26, and is at very low altitude. The adjustments in airspeed to compensate for the head wind losses and gains are difficult for the pilot to execute when there is no warning of the possible hazardous condition.

A wind shear alert system 10 of the present invention, shown in FIG. 1, uses a network 12 of remote sensor stations 14 to detect a microburst 16 (FIGS. 5 and 6). The remote stations 14 of the network 12, shown in FIG. 2, supply wind field measurements or data 36 (FIG. 3) to a base station computer 34 which stores the data as wind vectors 28 (FIG. 4) representative of the wind velocity, speed and direction. The wind field is represented by the wind vectors 28 of each of the stations 14 over the network 12. The wind shear alert system 10 then processes the wind field data 36. The base station computer 34 generates alphanumeric alarms 48 in the form of messages differentiating between microbursts and other horizontal wind shear. Besides differentiating the wind shear type, i.e., microburst or other wind shear, the alarm 48 also issues messages capable of distinguishing between a microburst or wind shear alert with head wind gain or head wind loss. The gain or loss value and the microburst or shear location in nautical miles from the threshold of the specific runway 24 of the airport 26 is indicated in the alarm message.

The alarm messages are of value to pilots of the aircraft 20 during arrival or departure from the runway 24 of the airport 26. The pilots have advance warning of the type of wind shear, microburst or other wind shear, the magnitude of the wind shear in terms of relative gain or loss of aircraft performance based on head wind, and the location of the wind shear in nautical miles from the runway. Based on this information, the pilot is forewarned and is prepared to make adjustments in his airspeed to compensate for the wind shear losses or gains in the aircraft 20 performance. In executing an arrival, in extreme situations the pilot may elect to go around the airport 26 and try again after the microburst passes.

The outline for a computer program implementing the process of the wind shear alert system 10 is shown in FIG. 3 and Appendix I; a specification for a computer program implementing the wind shear alert system 10. With reference to Appendix I, page ii, the process implementing the wind shear alert system 10 and shown in the flow chart of FIG. 3 consists of the steps of filtering wind data 38, network mean computation 40, divergence 42, loss or gain 44, location 46, and alarm messages 48. Still with reference to Appendix I, pages iii through xxxiv show additional detail of each step of a computer program algorithm that would implement the method of the wind shear alert system 10.

The wind shear alert system 10 of the present invention is able to generate the alarm messages based upon the wind field measurements or data 36 and parameters which are preselected and stored in the base station computer 34 in an airport configuration file 30, attached hereto as Appendix II. This input is then processed as shown in FIG. 3 and Appendix I.

Representative constants and the computations necessary to generate the parameters used in the airport configuration file 30 are shown in Appendix III. Appendices I, II and III are attached hereto and incorporated herein by reference.

The remote sensor stations 14, which define the network 12 shown in relation to the runways 24 in FIG. 2, are positioned strategically relative to the runways 24. The exact locations of the sensor stations 14 will vary with each different airport 26, dependent upon the runway location and other geometric and geographic considerations. Generally speaking, the sensor stations 14 are located between 1.5 and 2.5 kilometers apart and generally parallel to and on either side of a single or parallel extending runways 24.

Each of the remote sensor stations 14 includes an anemometer 32 mounted on a tower (not shown). The anemometer 32 measures wind velocity, speed and direction. Wind speed and direction, represented as the wind vector 28, having U and V components in a Cartesian coordinate system shown in FIG. 4, are generated. A signal representative of the wind vector 28 is transmitted by a telecommunications package 33 associated with the remote sensor station 14 to the base station computer 34. Additional details of the wind shear alert system 10 can be obtained by reference the United States Department of Transportation's FAA Specification on Low-Level Wind Shear Alert System (LLWAS), Technical Specification Number FAA-E-2697A, dated Mar. 6, 1989, which specification is incorporated by reference herein as though fully set forth.

The wind field measurements 36 are periodically polled by the base station computer 34 (FIG. 3). The results of a predetermined number of polling cycles are maintained in the base station computer 34 and are utilized in performing the wind shear alert system computations as will be discussed hereinafter. The base station computer 34 stores the airport configuration file 30 and the wind field measurements 36. In addition, the filtering of wind data 38, the network mean computation 40, the divergence computation 42, the loss gain computation 44 and location of any wind shear 46 are all computed by the base station computer 34 using a computer program based on the algorithm of Appendix I. Based on the results of those computations, the alarm messages are issued to an air traffic control tower 27 at the airport 26. At the tower 27 the message is displayed on an air traffic controller display 49. The air traffic controller radios the information to the pilot of the aircraft 20.(FIG. 1.)

Referring to FIG. 3 and to Appendix I, the first step of the process of the wind shear alert system 10 is to filter the wind data 38. Pre-checks are made to insure that good data on the wind vectors 28 is available in the sense that the sensor stations 14 are reporting current winds. The data are filtered through a weighted mean running average process, which smooths the data. The parameters for controlling the weighted mean running average process are the length of the filter and the weightings that are used in the computation of the weighted means. The weighted running mean is based on holding the last several data values for each station in a circular queue and computing the filtered value (u(k), v(k)) of the station wind velocity vector at poll number k;

$$U(k) = \sum_{i=0}^{n-1} (i-k) u^*w(i)$$

$$V(k) = \sum_{i=0}^{n-1} v(i-k)^*w(i)$$

where $w(0), \ldots, w(n-1)$ is the list of filter weights. Further details of a computer based calculation are given in the process FILTER_WIND_DATA of Appendix I, p. vi and vii.

During the computation of the network mean computation 40, a sample network mean, a wind vector representative of the ambient wind 22 in the network 12, is estimated for each poll taken of the wind field measurements 36. This estimate is computed based upon the filtered wind data 38. During this step of the method of the wind shear alert system 10, it is determined whether or not some of the remote sensor station 14 data are extreme outliers. If they are outliers, they are discarded and the current network mean estimate is computed from the remaining data. The standard deviation is also computed. These computations are compared against the network mean and standard deviation from the previous polls by weighted averaging. This combination of averaging across the network 12 and averaging over time creates very stable estimates.

The network mean estimate is computed by
U_temp = 1/m Σ U(j)
V_temp = 1/m Σ V(j)
U_bar = A * U_bar(previous) + (1−A) * U_temp
V_bar = A * V_bar(previous) + (1−A) * V_temp
where m is the number of untrimmed stations and the index j runs over all untrimmed stations. Details are provided for a computer program implementing the process in NETWORK_MEAN of Appendix I, p.p. ix through xi.

The next step of the method of the wind shear alert system is the computation of the wind field divergence 42 and the determination of whether or not there is a persistent wind field divergence or wind sheer. This determination is based on the filtered wind data 38, as well as parameters from the airport configuration file 30 relating to the actual geometry of the network 12. Divergence is computed along edges 50, and over triangles 51 (FIGS. 2, 5, 6 and 7). Edges 50 are visualized as the line segment between two relatively close pairs of remote sensor stations 14. These pairs of stations are listed in the airport configuration file 30. The triangles 51, consisting of a triple of the remote sensor stations 14, allow computation of a two dimensional divergence. Again the remote sensor stations 14 of the triangles 51 are relatively close and are listed in the airport configuration file 30. The airport configuration file 30 also contains the direction vectors of the edges 50, direction vectors of the sides of the triangles 52, the lengths of the edges 50 and the areas of the triangles 52. See Appendix II.

The wind field divergence 42 may be visualized physically by reference to FIGS. 5 and 6. As seen in FIG. 5, a ambient wind 22 is perceived by the arriving aircraft 20. The microburst 16 strikes the ground intermediate two sensor stations 14, creating wind shears 18. The aircraft 20 is on approach to the airport 26 to land on the runway 24. The remote stations 14 will indicate the wind velocity vectors 28 in essentially opposite directions for the shown stations 10, indicating the presence of the wind shears 18. As previously stated, the problem for the pilot of the aircraft 20 is an initial increase in head wind at one end of the edge 50 followed by a decrease in head wind as the pilot passes through the microburst 16.

With reference to FIG. 6, three remote sensor stations 14 define the triangle 52. Rather than flying along the edge 50 parallel to the runway 24, as was the case in the example of FIG. 5, in FIG. 6 the aircraft 20 passes through the ambient wind 22 and travels over the triangle 52 defined strategically relative to the runway 24. The head wind loss or gain is analyzed in two dimensions rather than one, as was the case in the divergence analysis for the edge 50.

Turning to FIG. 2, the network 12 of the remote sensor stations 14 can include numerous edges 50 and triangles 52 as are indicated in dotted line. Depending upon which of the runways 24 an arriving or departing aircraft 20 uses, different ones of the edges 50 or the triangles 52 may be more important to the wind shear alert system 10. One of the edges 50 can also be part of one of the triangles 52.

Divergence is compared to divergence thresholds. The ratio of the measured divergence value is made to a divergence threshold value. A ratio greater than 1 indicates that a hazardous divergence wind shear is occurring at the indicated edge 50 or triangle 52. The airport configuration file 30 contains triangle divergence thresholds and edge divergence thresholds, as well as triangle and edge convergence thresholds used to measure whether or not the severe negative divergence is occurring, resulting in a head wind gain.

A noise adaptive threshold, is computed as part of computing the divergence 42. The adaptive threshold is a factor multiplied by the standard deviation computed from the network mean computation 40. In the case of extremely gusty winds, the standard deviation will be a large number and the noise adaptive threshold will be used to desensitize the wind shear alert system 10 from issuing alarm messages that are not the consequence of hazardous wind shear but rather just expected variations in a very noisy wind field.

If, during the computations of the divergence 42, an edge 50 or triangle 52 is determined to have a large divergence or convergence, then it is necessary to determine whether or not that situation has persisted. Noisy wind fields can have fluctuations over time which appear and disappear and do not persist. Only persistent fluctuations indicate a hazardous condition to the arriving or departing aircraft 20. Again, parameters from the airport configuration file 30 control the determination of whether or not a divergence or convergence situation has persisted.

The edge divergence is the vector dot product $$Edge\_dvrg = (delta\_U, delta\_V) O \neq (dir\_x, -dir\_y)/L$$

where (delta_U,delta_V) is the wind differential along the edge, (dir_x,dir_y) is the edge direction vector and L is the edge length, both from the airport configuration file 30, Appendix II.

The triangle divergence is given by $$Tri\_dvrg = Ux + Vy$$

where the numerical derivative estimates (Ux, Uy) and (Vx, Vy) are computed by solving the matrix systems $$\begin{pmatrix} Ux \\ Uy \end{pmatrix} = \begin{pmatrix} X1 & X2 \\ Y1 & Y2 \end{pmatrix}^{-1} \begin{pmatrix} U2 - U1 \\ U3 - U1 \end{pmatrix}$$

$$\begin{pmatrix} Vx \\ Vy \end{pmatrix} = \begin{pmatrix} X1 & X2 \\ Y1 & Y2 \end{pmatrix}^{-1} \begin{pmatrix} V2 - V1 \\ V3 - V1 \end{pmatrix}$$

where the values U1, U2, U3, V1, V2, V3 are the wind field values at the triangle vertices and the values X1, Y1, X2, Y2 are the triangle side vectors, from the airport configuration file 30, Appendix II. Details for a computer program are provided in the process DIVERGENCE of Appendix I, p.p. xii and xiii.

Once a divergence is detected at the airport 26 and within the network 12, the method of the invention analyzes the loss 44 (FIG. 3) associated with the microburst or wind shear. A scaling factor, the effective length, is multiplied by the value of the divergence to give an estimate of the loss that an aircraft 20 could experience if it flew through the center of the microburst. The derivation of the effective length is based on a statistical analysis involving a theoretical microburst model, the lengths of the edges 50, and the sizes and shapes of the triangles 51. The loss estimate is proportional to the divergence measured in the network 12. If the divergence value is doubled, then the loss of head wind estimate is also doubled.

If a microburst loss of head wind is not detected, then a wind shear condition of less intensity might be present. Weaker divergence or convergence coupled with runway oriented loss or gain is indicative of wind shear 18. The runway oriented loss and gain is determined by station-to-station comparison. Remote sensor stations 14 that are relatively near each other along the runway 24 (FIG. 7) are used for the loss or gain computation. The list of those pairs are stored in the airport configuration file 30 for each runway 24, which also includes the along runway distance between the pairs of the stations 14.

After the divergence, convergence and loss or gain computations have been made, a check is made to see if a persistent loss or gain situation exists along the runway 24. The basis for an alarm message is a persistent divergence or persistent convergence on some edge or triangle or a persistent loss or gain on some runway. Persistence is measured in the sense of at least n satisfactory occurrences out of the last m polls. Circular persistence queues maintain a record of whether the divergence or convergence was in excess of the threshold value for each of the previous m polls, for each triangle and edge. Circular persistence queues also record if there was a loss or gain situation on each runway in excess of the wind shear threshold for each of the m previous polls. A count of the successes determines whether each persistence criteria is met. The lengths of the persistence queues and the persistence thresholds are provided in the airport configuration file 30, Appendix II. This approach to the handling of persistence allows a partial separation of the timeliness considerations inherent in the running average filters and additional delays that might be desired for alarm stability.

The final step is a decision as to whether or not to issue the alarm 48 and what type of alarm message to give must be generated. Several tests are made. Initially a divergence alarm indicates whether or not there is a microburst. Depending upon which edge 50 or triangle 52 is involved in the divergence alarm, locations for an arrival and departure aircraft 20 are determined. The location comes from a list of pointers available from the airport configuration file 30. A convergence alarm test is also done, but instead of looking for a positive divergence value, a negative divergence value is involved.

Wind shear with loss and wind shear with gain alarm tests compare the loss and gain values with the wind shear threshold set in the airport configuration file 30. There are also microburst tests. A divergence test leads to a microburst alarm situation if the loss value is large compared with the microburst threshold. The microburst threshold also comes from the airport configuration file 30. The alarm 48 step also arbitrates which alarm is most hazardous when several alarms are simultaneously available on the runway.

The basis for alarm arbitration is that a microburst is more hazardous than any other wind shear and that if the magnitudes are nearly equal, then a loss is more hazardous than a gain. Therefore, in the case of multiple alerts, if one of them is a microburst alert, then that alert, loss, and location is sent forward to the alphanumeric displays. In the absence of a microburst alert, if there is both a loss and gain, then the loss is given, unless the gain is substantially larger. Parameters from the airport configuration file 30 (LOSS_INCREMENT and LOSS_BUFFER) control the latter decision.

The alarm step of the method also predicts whether or not there is a possibility of a wind shear outside the network 12. A computation is made using the runway remote sensor station 14 locations and the runway direction vector. These values are taken from the airport configuration file 30, Appendix II.

As shown in FIG. 3, the airport configuration file 30 supplies a variety of constants to the computer program generated pursuant to the algorithm disclosed in Appendix I. The parameters for the airport configuration file, shown in a source code notation in one column and a short technical description in a second column are listed in Appendix II attached hereto and incorporated herein. The airport configuration file contains numbers which are specific to the airport 26 at which the wind shear alert system 10 is installed. For example, specific numbers include the latitude and longitude of specific runways and the location of the sensor stations 14.

Appendix III, which is attached hereto and incorporated herein, shows typical constants for some of the parameters of the airport configuration file 30 and the methodology in computing other parameters. These constants are used to control the operation of the computer program and include flag values, tolerances and count limits. In addition, there are filter constants which are applicable to several levels of filtering in the computer program for generating the airport configuration file 30. The wind field measurements 36 are filtered by weighted running means and the network mean and standard deviation are filtered by single poll recursive filters. The lengths of these filters and the filter constants are tailored to the length of the polling cycle and desired algorithm performance. Also included in the constants and computations of the airport configuration file is the network geometry, the locations of sensor stations 14, edges 50 and triangles 52, shown in FIGS. 5, 6 and 7.

The airport configuration file 30 will now be discussed in detail. The airport configuration file 30 contains lists of edges 50 and triangles 52 that are used in the wind field divergence computations. The sensor stations 14 are listed in some order and numbered. Although not required for algorithm execution, the latitudes and longitudes of the station 14 locations are included. Each edge 50 is described by the pair of station numbers that describes its endpoints, by its length, and by its unit direction vector. Typically, a pair of sensors 14 defines an edge 50 if its length is between one and a half and five and a half Km. Each triangle is described by the triple of station numbers that describes its vertices, by its area, and by a pair of unit direction vectors for two of its sides. The triple of station numbers is listed to correspond and the pair of unit direction vectors share the first vertex as their common base point. Typically, a triple of sensors defines a triangle if each of the sides has its length between one and a half and five and a half Km and if the smallest angle of the triangle is larger than twenty-five degrees.

Divergence and convergence thresholds are partially based on statistical analysis and are designed to avoid issuing alerts on statistically expected divergence values. In addition, these thresholds and the persistence thresholds incorporate management requirements for system performance such as minimum hazard level and timeliness of the alert.

Effective lengths are factors used to convert divergence estimates from triangles 52 and edges 50 into loss estimates when there is evidence that a microburst is present. They have been chosen statistically to give an unbiased estimate of the head wind loss that the aircraft 20 might encounter if it were to enter the microburst.

The loss or gain of head wind for each of the runways 24 needs lists of pairs of sensor stations 14 in the airport configuration file 30. For each pair of remote sensor stations 14, the station vertices and the along runway distance between the sensor stations 14 is listed in kilometers.

Each station sheltering sector is a wedge or arc of directions from which sheltering by some physical feature of the airport 26, such as a hill or building, renders the sensor station 14 to have unreliable wind vector 28 measurements. A wedge is provided for each sensor station 14. The wedge consists of the initial angle and the final angle, in degrees and measured counterclockwise from magnetic north. If there is no sheltering, then the wedge is described as 0, 0.

Runway geometry of each of the arrival runways 24 is represented by a unit direction vector. In addition, the runways 24 are described by their latitudes and longitudes and by their Cartesian coordinates in the airport coordinate system. This information is not necessary for the algorithm but is included for completeness.

Finally, runway alarm location pointers are generated by the airport configuration file 30. Each sensor station 14, edge 50 and triangle 52 is associated with two positions along each of the arrival runways 24, the arrival location and a departure location, the latter for the oppositely directed runway 24. The location pointers have values of 0, 1, 2, 3 or RWY-LOC FLAG. A zero (0) indicates "on the runway," 1, 2, or 3 indicates the distance from the runway 24 threshold in nautical miles and RWY-LOC FLAG indicates that the element is not associated with this runway.

In operation, the process includes wind data filtering 38 by a running weighted mean. The wind field measurement 36 data from the current poll of the remote sensor stations 14 and several previous polls, approximately 2 minutes worth of data kept in circular data queues, is combined with filter weights to compute the weighted mean of the wind field measurements 36 from the current poll of the remote stations 14 and whatever number of previous polls is appropriate. The advantage of using this filter mode is that it is easy to determine what happens to the data, both from the viewpoint of suppressing the variance of the data and from the viewpoint of the amount of time lag if an impulse or step function is introduced into the data stream. Separate filters are used for the four basic computations, i.e., Mode 1 is the network mean, Mode 2 is divergence, Mode 3 is microburst loss and Mode 4 is runway oriented loss and gain.

The network mean computation is used to get a robust estimate of the mean. Data trimming is based on chi-squared tests. After the removal of outliers, estimates of the network mean and standard deviation are computed from the current poll. These estimates are combined with the estimates from prior polls by weighted averaging. The divergence estimation involves numerical differentiation along the edges 50 and the triangles 52. The triangle derivations are combined to compute the two-dimensional divergence. The numerical differentiation process is a simple first order derivative procedure that is standard in numerical mathematics.

When there is evidence of persistent divergence on a edge 50 or triangle 52, then the value of that divergence is re-estimated using more heavily filtered wind field measurements 36, Mode 3. This stabilized divergence is multiplied by the effective length, a scaling factor obtained from the airport configuration file 30 to provide the microburst lost estimate. If the microburst estimate is less than the microburst threshold, only wind shear is indicated and the runway oriented loss or gain is computed.

The loss or gain estimates are computed by simply looking at the component of the wind field and the direction parallel to the runway 24 and going a station-to-station comparison to determine whether or not a loss situation or a gain situation is available. These stations are listed in the airport configuration file 30.

In both circumstances, loss or gain, the location of the most severe loss or gain is estimated and that is used to estimate the location at which the wind shear 18 will be encountered by an arriving or departing aircraft 20. In the hierarchy of the alarm tests 48 evidence of a microburst alert, is always given to the pilot. A weak divergence alarm, possibly not rising to the level of a microburst, is compared to the runway oriented loss or gain and a decision is made weather or not the loss or gain situation is predominant. The dominant hazard situation, loss or gain, is radioed to the pilot.

The alarm 48 concerning wind shear 18 outside the network 12 is issued only in a case where there is a gain situation on the runway 24, which is at the far end of the portion of the runway that is protected by the network. If there is a gain situation, it is possible there is more wind shear 18 beyond the network 12. The method evaluates the situation and issues an alarm if it is appropriate.

Although the present invention has been described with a certain degree of particularity, it is understood that the present disclosure has been made by way of example, and changes in detail or structure may be made without departing from the spirit of the invention, as defined in the appended claims.

APPENDIX I 2.0 PROGRAMMING NOTES

Several conventions were introduced in a attempt to clarify the intent of the algorithm specification. We recall these notational conventions to aid the understanding of the reader.

```
!=              Not equal
>=              Greater than or equal to
<=              Less than or equal to
(logical)       Indicates a variable that is used for
                logical indication; it is not required
                that the software use a logical variable
```

We have used the following capitalization conventions:
```
    ALL CAPS        Parameter (ACF)
    Capitolized     Global or 'Save' variables
    lower case      Local variables and the raw station winds
```

The Message structure is intended only to convey content, not to constrain software style. The alarm type is to distinguish between
```
        WSA         wind shear alert
        MBA         microburst alert
        Null        no alert
```

The Loss/Gain value is used to compute the LOSS/GAIN value in the Runway Alarm Message that is composed in a Display Task. The value produced by this algorithm is expressed in m/s. The value required for the Runway Alarm Message is expressed in Knots, rounded to the nearest 5 Knots. If the value is positive then it is a gain and if it is negative then it is a loss. The Location value in the message is an integer with value 0, 1, 2, or 3.

The Possible_wind_shear_outside(rwy) message applies to both the arrival runway and the associated departure runway. It is incorporated into the alphanumeric messages for these runways in the display task.

For the most part, we have refrained from using implicit logic in the algorithm. The one exception is the use of loss = 0 or gain = 0 to indicate that no alert is indicated. This convention is used with the loss and gain values that are the output of MB_LOSS and RUNWAY_ORIENTED_LOSS_AND_GAIN. In particular, 0 is the assigned value for any station, edge, or triangle that is inactive. Therefore, checking for positive loss or gain replaces checking Station_active flags during the alarm tests.

WSMB ALGORITHM

The driver for the data analysis and Wind Shear and Microburst alarm generation for the Network Expansion LLWAS.

Parameters (All read from government furnished Airport Configuration File -- ACF )

Computations

For each poll of the station winds (t)

Compute FLAG_SHELTERED_DATA

```
Compute FILL_DATA_GAPS

Compute FILTER_WIND_FIELD_DATA

Filter Mode = 1:  used for Network Mean
               = 2:  used for Divergence
               = 3:  used for MB Loss
               = 4:  used for Runway Loss and Gain Compute ELEMENT_ACTIVE_FLAGS
```
— 38

```
Compute NETWORK_MEAN
```
— 40

```
Compute DIVERGENCE

Compute DIVERGENCE_RATIO

Compute DIVERGENCE_PERSISTENCE
```
— 42

| Compute MB_LOSS |
| Compute RUNWAY_ORIENTED_LOSS_AND_GAIN |
| Compute LOSS_AND_GAIN_PERSISTENCE |

_44, 46_

| Compute DVRG_ALARM_TEST |
| Compute CVRG_ALARM_TEST |
| Compute WS_LOSS_TEST |
| Compute WS_GAIN_TEST |
| Compute RUNWAY_ALARM_ARBITRATION |
| Compute POSSIBLE_WIND_SHEAR_OUTSIDE_MESSAGE |

_48_

END       (WSMB ALGORITHM)

FLAG_SHELTERED_DATA

Insert missing data flags for winds that come from a station-sheltered direction.

```
Parameters
    FLAG
    NUM_STATION
    SHELTERED_WEDGE_LOW(stat)     stat=1,NUM_STATION
    SHELTERED_WEDGE_HIGH(stat)    stat=1,NUM_STATION Input     (for each poll time t)
    u(t,stat), v(t,stat) stat=1,NUM_STATION Output    (for each poll time t)
    u(t,stat), v(t,stat) stat=1,NUM_STATION Computation FOR each station (stat = 1,NUM_STATION)

IF  (a) SHELTERED_WEDGE_HIGH(stat) != SHELTERED_WEDGE_LOW(stat) and
        (b) u(t,stat) != FLAG  and  v(t,stat) != FLAG              and
        (c) ( u(t,stat)*u(t,stat) + v(t,stat)*v(t,stat) ) > 4 dir = Wind_direction( u(t,stat), v(t,stat) )

***  It is assumed that the Wind_direction function returns a
        ***  degree value between 0 and 360 (including 0 but not 360)
        ***  measured from magnetic north and counter-clockwise IF ( SHELTERED_WEDGE_HIGH(stat) > SHELTERED_WEDGE_LOW(stat) )

IF (dir > SHELTERED_WEDGE_LOW(stat)
                        and dir < SHELTERED_WEDGE_HIGH(stat))

u(t,stat) = FLAG
                v(t,stat) = FLAG

ENDIF

ELSEIF ( SHELTERED_WEDGE_HIGH(stat) < SHELTERED_WEDGE_LOW(stat) )

IF ( (dir > SHELTERED_WEDGE_LOW(stat) and direction < 360)
                    or (dir >= 0 and dir < SHELTERED_WEDGE_HIGH(stat) )
```

```
                    u(t,stat) = FLAG
                    v(t,stat) = FLAG
            ENDIF

ENDIF

ENDIF

ENDFOR (stat)

END  (FLAG_SHELTERED_DATA)

FILL_DATA_GAPS

Fill short gaps in time series of station data with past data.

Parameters
    SHORT_GAP
    LONG_GAP
    FLAG
    NUM_STATION

Initialization     (before network start or restart)
    Station_down_counter(stat) = 100    stat = 1,NUM_STATION Input      (for each poll time t)
    u(t,stat), v(t,stat) stat=1,NUM_STATION Output     (for each poll time t)
    u(t,stat), v(t,stat) stat=1,NUM_STATION Save for next call
    station_down_counter(stat), last_u_value(stat), last_v_value(stat)
                                                stat = 1,NUM_STATION Computation FOR each station (stat = 1,NUM_STATION)

IF ( u(t,stat) != FLAG  and  v(t,stat) != FLAG )
            station_down_counter(stat) = 0 last_u_value(stat) = u(t,stat)
            last_v_value(stat) = v(t,stat)

ELSE
            station_down_counter(stat) =
                min { station_down_counter(stat) + 1, LONG_GAP }

IF ( station_down_counter(stat) <= SHORT_GAP )
                u(t,stat) = last_u_value(stat)
                v(t,stat) = last_v_value(stat)
            ELSE
                u(t,stat) = FLAG
                v(t,stat) = FLAG
            ENDIF
        ENDIF ENDFOR (stat)

END  (FILL_DATA_GAPS)
```

FILTER_WIND_DATA

Maintain station data queues and compute running weighted mean filters for station wind data.

Parameters
```
    QUEUE_LENGTH
    NUM_STATION
    NUM_FILTER
    FILTER_LEN(mode)    mode=1,NUM_FILTER
    W(k,mode)           k=1,FILTER_LEN(mode)   mode=1,NUM_FILTER
    FLAG
    STATION_ACTIVE_LIMIT
```

Initialization    (before network start or restart)
    Initialize all data queues and station active counters to zero.

Input
    u(t,stat), v(t,stat)   stat=1,NUM_STATION

Output
    U(stat,mode), V(stat,mode)   stat=1,NUM_STATION
                                 mode=1,NUM_FILTER Station_active_counter(stat)  stat=1,NUM_STATION

Save for next call
    All data queues.

Computation

A. Update Data Queues:
   i.   Increment Queue Pointer I (modulo QUEUE_LENGTH)

ii.  Store u(t,stat), v(t,stat) in the data queue at position I iii. FOR each station (stat=1,NUM_STATION)

IF ( u(t,stat) != FLAG )
               Station_active_counter(stat) = min { QUEUE_LENGTH,
                            Station_active_counter(stat) + 1 }
           ELSE
               Station_active_counter(stat) = 0
           ENDIF ENDFOR (stat)

B. Compute Filter Values:
   FOR each station (stat = 1,NUM_STATION)
   FOR each filter_mode (mode = 1,NUM_FILTER)
       Length = min{Station_active_counter(stat),FILTER_LEN(mode)}

IF ( Length >= STATION_ACTIVE_LIMIT )

WT = SUM: W(k,mode)
               where the summations are over all k
                                        from k=0 to Length-1

U(stat,mode) = (1/WT)*(SUM: W(k,mode)*U(stat,[I-k]))
                   where the summations are over all k
                                        from k=0 to Length-1

V(stat,mode) = (1/WT)*(SUM: W(k,mode)*V(stat,[I-k]))
                   where the summations are over all k
                                        from k=0 to Length-1 where [I-k] denotes the pointer position in the
                   queue, backwards from I, modulo QUEUE_LENGTH

ELSE

```
                U(stat,mode) = FLAG
                V(stat,mode) = FLAG

ENDIF

ENDFOR (mode)
        ENDFOR (stat)

END  (FILTER_WIND_DATA)

ELEMENT_ACTIVE_FLAG

Determine which stations, edges, and triangles have current data for
algorithm computations.

Parameters
    NUM_STATION
    NUM_EDGE
    NUM_TRI
    EDGE_VERTEX(edge,j)             edge=1,NUM_EDGE    j=1,2
    TRI_VERTEX(tri,j)               tri=1,NUM_TRI      j=1,3
    STATION_ACTIVE_LIMIT Input
    Station_active_counter(stat)    stat=1,NUM_STATION Output
    Station_active(stat)            stat=1,NUM_STATION    (logical)
    Edge_active(edge)               edge=1,NUM_EDGE       (logical)
    Tri_active(tri)                 tri=1,NUM_TRI         (logical)
    Num_station_active Computation
    FOR each station (stat = 1,NUM_STATION)
        Set the logical value:
        Station_active(stat) = ( Station_active_counter(stat)
                                      <= STATION_ACTIVE_LIMIT )
    ENDFOR (stat)

Num_station_active = 'number of active stations'

FOR each edge (edge = 1,NUM_EDGE)
        Set the logical value:
        Edge_active(edge) = ( Station_active( EDGE_VERTEX(edge,1))
                        and  Station_active( EDGE_VERTEX(edge,2)))
    ENDFOR (edge)

FOR each triangle (tri = 1,NUM_TRI)
        Set the logical value:
        Tri_active(tri) = ( Station_active( TRI_VERTEX(tri,1))
                      and   Station_active( TRI_VERTEX(tri,2) )
                      and   Station_active( TRI_VERTEX(tri,3) ))
    ENDFOR (tri)

END  (ELEMENT_ACTIVE_FLAG)

NETWORK_MEAN

Compute a stable estimate of the mean wind field by trimming outliers and
applying temporal smoothing.

Parameters

NUM_STATION
    MEAN_FILTER
    SD_FILTER
    TRIM_THRESH
```

```
        TRIM_NUM
        SIGMA_MIN

Input

U(stat), V(stat), Station_active(stat)        stat = 1, NUM_STATION
                    *** Wind field filtered by filter mode = 1 ***
        Num_station_active
        U_bar, V_bar
        Sigma_U, Sigma_V, Sigma Output U_bar, V_bar
        Sigma_U, Sigma_V, Sigma Initialization  (first call after an algorithm restart)

Compute the first estimate of the mean and station residual:

U_bar = ( SUM: U(stat) ) / Num_station_active
        V_bar = ( SUM: V(stat) ) / Num_station_active
            where the sum is taken over all active stations FOR each active station (stat = 1, NUM_STATION)

Residual(stat) = ( U(stat) - U_bar )2 + ( V(stat) - V_bar )2

ENDFOR (stat)

Apply trimming and compute the final estimate of the mean and
station residual:

Num_untrimmed _station = Num_station_active - TRIM_NUM
        U_bar = ( SUM: U(stat) ) / ( Num_untrimmed_station )
        V_bar = ( SUM: V(stat) ) / ( Num_untrimmed_station )
            where the sum is taken over all active stations
            except for the TRIM_NUM stations with the largest residuals FOR each active station (stat = 1, NUM_STATION)

Residual_U(stat) = ( U(stat) - U_bar )**2
            Residual_V(stat) = ( V(stat) - V_bar )**2

ENDFOR (stat)

Variance_U = ( SUM: Residual_U(stat) ) / Num_untrimmed_station
        Variance_V = ( SUM: Residual_V(stat) ) / Num_untrimmed_station
            where the summations are over all active stations
            except for the TRIM_NUM stations with the largest residuals Sigma_U = Max{ Sigma_min, SQRT ( Variance_U ) }
        Sigma_V = Max{ Sigma_min, SQRT ( Variance_V ) }
        Sigma   = Max{ Sigma_U, Sigma_V }

Computation

FOR each active station    (stat = 1, NUM_STATION)

Residual_U(stat) = ( U(stat) - U_bar )**2
        Residual_V(stat) = ( V(stat) - V_bar )**2

No_trim(stat) = ( TRIM_THRESH >
                ( Residual_U / Sigma_U**2 + Residual_V / Sigma_V**2 ) )
                                                                    (logical)
ENDFOR (stat)

M = 'number of stations with No_trim(stat) = true'
```

```
U_bar_temp = ( SUM: U(stat) ) / M
V_bar_temp = ( SUM: V(stat) ) / M
        where the summations are over all (M) active, untrimmed stations
        ( No_trim(stat) = true )

U_bar = MEAN_FILTER * U_bar + ( 1 - MEAN_FILTER ) * U_bar_temp
V_bar = MEAN_FILTER * V_bar + ( 1 - MEAN_FILTER ) * V_bar_temp FOR each active station (stat = 1, NUM_STATION)

Residual_U(stat) = ( U(stat) - U_bar )**2
        Residual_V(stat) = ( V(stat) - V_bar )**2

ENDFOR (stat)

Variance_U = ( SUM: Residual_U(stat) ) / ( M-1 )
Variance_V = ( SUM: Residual_V(stat) ) / ( M-1 )
        where the summations are over all (M) active, untrimmed stations
        ( No_trim(stat) = true )

Sigma_U_temp = Max{ Sigma_min, SQRT ( Variance_U ) }
Sigma_V_temp = Max{ Sigma_min, SQRT ( Variance_V ) }

Sigma_U = SD_FILTER * Sigma_U + ( 1 - SD_FILTER ) * Sigma_U_temp
Sigma_V = SD_FILTER * Sigma_V + ( 1 - SD_FILTER ) * Sigma_V_temp
Sigma   = Max{ Sigma_U, Sigma_V }

END     (NETWORK_MEAN)
```

DIVERGENCE

Divergence computations for edges and triangles.

Parameters

```
    NUM_STATION
    NUM_EDGE
    NUM_TRI
    EDGE_DIR_X(edge), EDGE_DIR_Y(edge)    edge = 1, NUM_EDGE
    EDGE_VERTEX(edge,j)                   edge = 1, NUM_EDGE,  j = 1,2
    EDGE_LENGTH(edge)                     edge = 1, NUM_EDGE
    TRI_VERTEX(tri,j)                     tri = 1, NUM_TRI,    j = 1,2,3
    TRI_AREA(tri)                         tri = 1, NUM_TRI
    X1(tri), Y1(tri),
      X2(tri), Y2(tri)                    tri = 1, NUM_TRI
```

Input

```
    U(stat), V(stat)                      stat = 1, NUM_STAT
                      *** Wind field filtered by filter mode = 2 ***
    Edge_active(edge)                     edge = 1, NUM_EDGE   (logical)
    Tri_active(tri)                       tri = 1, NUM_TRI     (logical)
```

Output

```
    Edge_dvrg(edge)                       edge = 1, NUM_EDGE
    Tri_dvrg(tri)                         tri = 1, NUM_TRI
```

Computation

```
FOR each edge   (edge = 1, NUM_EDGE)

IF ( Edge_active(edge) )

delta_u = U( EDGE_VERTEX(edge,2) ) - U( EDGE_VERTEX(edge,1) )
        delta_v = V( EDGE_VERTEX(edge,2) ) - V( EDGE_VERTEX(edge,1) )

Edge_dvrg(edge) =
```

```
            ( delta_u * EDGE_DIR_X(edge) +
                  delta_v * EDGE_DIR_Y(edge)   ) / EDGE_LENGTH(edge)

ELSE

Edge_dvrg(edge) = 0

ENDIF

ENDFOR   (edge)

FOR each triangle (tri = 1, NUM_TRI)

IF ( Tri_active(tri) )

u1 = U( EDGE_VERTEX(tri,2) ) - U( EDGE_VERTEX(tri,1) )
          v1 = V( EDGE_VERTEX(tri,2) ) - V( EDGE_VERTEX(tri,1) )

u2 = U( EDGE_VERTEX(tri,3) ) - U( EDGE_VERTEX(tri,1) )
          v2 = V( EDGE_VERTEX(tri,3) ) - V( EDGE_VERTEX(tri,1) )

u_x = ( Y1(tri) * u2 - Y2(tri) * u1 ) / ( 2 * AREA(tri) )
          v_y = ( v1 * X2(tri) - v2 * X1(tri) ) / ( 2 * AREA(tri) )

Tri_dvrg(tri) = u_x + v_y

ELSE

Tri_dvrg(tri) = 0

ENDIF

ENDFOR   (tri)

END   (DIVERGENCE)
```

DIVERGENCE_RATIO

Ratios of computed divergence values to divergence and convergence thresholds.

Parameters

```
NUM_EDGE
NUM_TRI
EDGE_DVRG_THRESHOLD(edge)            edge = 1, NUM_EDGE
EDGE_CVRG_THRESHOLD(edge)            edge = 1, NUM_EDGE
EDGE_FACTOR(edge)                    edge = 1, NUM_EDGE
TRI_DVRG_THRESHOLD(tri)              tri = 1, NUM_TRI
TRI_CVRG_THRESHOLD(tri)              tri = 1, NUM_TRI
TRI_FACTOR(tri)                      tri = 1, NUM_TRI
```

Input

```
Edge_active(edge)                    edge = 1, NUM_EDGE    (logical)
Edge_dvrg(edge)                      edge = 1, NUM_EDGE
Tri_active(tri)                      tri = 1, NUM_TRI      (logical)
Tri_dvrg(tri)                        tri = 1, NUM_TRI
Sigma
```

Output

```
Edge_dvrg_ratio(edge), Edge_cvrg_ratio(edge)     edge = 1, NUM_EDGE
Tri_dvrg_ratio(tri),  Tri_cvrg_ratio(tri)        tri = 1, NUM_TRI
```

Computation

```
    FOR each edge (edge = 1, NUM_EDGE)

IF ( Edge_active(edge) )
            threshold = Max{ EDGE_DVRG_THRESHOLD(edge),
                                        Sigma * EDGE_FACTOR(edge) }
            Edge_dvrg_ratio(edge) = Edge_dvrg(edge) / threshold
            threshold = Max{ EDGE_CVRG_THRESHOLD(edge),
                                        Sigma * EDGE_FACTOR(edge) }
            Edge_cvrg_ratio(edge) = - Edge_dvrg(edge) / threshold
        ELSE
            Edge_dvrg_ratio(edge) = 0
            Edge_cvrg_ratio(edge) = 0
        ENDIF ENDFOR (edge)

FOR each triangle (tri = 1, NUM_TRI)

IF ( Tri_active(tri) )
            threshold = Max{ TRI_DVRG_THRESHOLD(tri),
                                        Sigma * TRI_FACTOR(tri) }
            Tri_dvrg_ratio(tri) = Tri_dvrg(tri) / threshold
            threshold = Max{ TRI_CVRG_THRESHOLD(tri),
                                        Sigma * TRI_FACTOR(tri) }
            Tri_cvrg_ratio(tri) = - Tri_dvrg(tri) / threshold
        ELSE
            Tri_dvrg_ratio(tri) = 0
            Tri_cvrg_ratio(tri) = 0
        ENDIF ENDFOR (tri)

END (DIVERGENCE_RATIO)
```

DIVERGENCE_PERSISTENCE

Maintain divergence alarm queues and test for persistent alarm level values for each edge and triangle.

Parameters

```
    PERSIS_QUE_LENGTH
    DVRG_QUE_LENGTH
    CVRG_QUE_LENGTH
    EDGE_DVRG_PERSIS_THRESH
    EDGE_CVRG_PERSIS_THRESH
    TRI_DVRG_PERSIS_THRESH
    TRI_CVRG_PERSIS_THRESH
    NUM_EDGE
    NUM_TRI
```

Initialization

```
    index = 1, PERSIS_QUE_LENGTH
        Tri_dvrg_alarm_que(index,tri)  = 0      tri  = 1, NUM_TRI
        Tri_cvrg_alarm_que(index,tri)  = 0      tri  = 1, NUM_TRI
        Edge_dvrg_alarm_que(index,edge) = 0     edge = 1, NUM_EDGE
        Edge_cvrg_alarm_que(index,edge) = 0     edge = 1, NUM_EDGE
```

Input

```
    Tri_dvrg_ratio(tri)              tri  = 1, NUM_TRI
    Tri_cvrg_ratio(tri)              tri  = 1, NUM_TRI
    Tri_active(tri)                  tri  = 1, NUM_TRI    (logical)
    Edge_dvrg_ratio(edge)            edge = 1, NUM_EDGE
    Edge_cvrg_ratio(edge)            edge = 1, NUM_EDGE
    Edge_active(edge)                edge = 1, NUM_EDGE   (logical)
```

Output

```
    Tri_dvrg_persis(tri)              tri  = 1, NUM_TRI
    Tri_cvrg_persis(tri)              tri  = 1, NUM_TRI
    Edge_dvrg_persis(edge)            edge = 1, NUM_EDGE
    Edge_cvrg_persis(edge)            edge = 1, NUM_EDGE
```

Computation

A. Update Queues:

i.  Increment Queue Pointer I (modulo PERSIS_QUE_LENGTH):

ii. Enter the Edge Divergence Alarm Flag:

```
    FOR each edge (edge = 1, NUM_EDGE)

IF ( Edge_active(edge) )
            IF ( Edge_dvrg_ratio(edge) >= 1 )
                Edge_dvrg_alarm_que(I,edge) = 1
            ELSE
                Edge_dvrg_alarm_que(I,edge) = 0
        ELSE
            FOR each item in alarm que (item = 1,PERSIS_QUE_LENGTH)
                Edge_dvrg_alarm_que(item,edge) = 0
            ENDFOR (item)
        ENDIF
    ENDFOR (edge)
``` iii. Enter the Edge Convergence Alarm Flag:

```
    FOR each edge (edge = 1, NUM_EDGE)
        IF ( Edge_active(edge) )
            IF ( Edge_cvrg_ratio(edge) >= 1 )
                Edge_cvrg_alarm_que(I,edge) = 1
            ELSE
                Edge_cvrg_alarm_que(I,edge) = 0
            ENDIF
        ELSE
            FOR each item in alarm que (item = 1,PERSIS_QUE_LENGTH)
                Edge_cvrg_alarm_que(item,edge) = 0
            ENDFOR (item)
        ENDIF
    ENDFOR (edge)
``` iv. Enter the Triangle Divergence Alarm Flag:

```
    FOR each triangle (tri = 1, NUM_TRI)
        IF ( Tri_active(tri) )
            IF ( Tri_dvrg_ratio(tri) >= 1 )
                Tri_dvrg_alarm_que(I,tri) = 1
            ELSE
                Tri_dvrg_alarm_que(I,tri) = 0
            ENDIF
        ELSE
            FOR each item in alarm que (item = 1,PERSIS_QUE_LENGTH)
                Tri_dvrg_alarm_que(item,tri) = 0
            ENDFOR (item)
        ENDIF
    ENDFOR (tri)
``` v. Enter the Triangle Convergence Alarm Flag:

```
    FOR each triangle (tri = 1, NUM_TRI)
        IF ( Tri_active(tri) )
            IF ( Tri_cvrg_ratio(tri) >= 1 )
                Tri_cvrg_alarm_que(I,tri) = 1
            ELSE
                Tri_cvrg_alarm_que(I,tri) = 0
            ENDIF
```

```
        ELSE
            FOR each item in alarm que (item = 1,PERSIS_QUE_LENGTH)
                Tri_cvrg_alarm_que(item,tri) = 0
            ENDFOR (item)
        ENDIF
    ENDFOR (tri)
```

B. Determine Persistence:

```
    FOR each edge (edge = 1, NUM_EDGE)

edge_sum = SUM: Edge_dvrg_alarm_que(edge,[I-k])
            where the summations are over all k
                                    from k=0 to DVRG_QUE_LENGTH-1

Edge_dvrg_persis(edge) = ( edge_sum >= EDGE_DVRG_PERSIS_THRESH)

ENDFOR (edge)

FOR each edge (edge = 1, NUM_EDGE)

edge_sum = SUM: Edge_cvrg_alarm_que(edge,[I-k])
            where the summations are over all k
                                    from k=0 to CVRG_QUE_LENGTH-1

Edge_cvrg_persis(edge) = ( edge_sum >= EDGE_CVRG_PERSIS_THRESH)

ENDFOR (edge)

FOR each triangle (tri = 1, NUM_TRI)

tri_sum = SUM: Tri_dvrg_alarm_que(tri,[I-k])
            where the summations are over all k
                                    from k=0 to DVRG_QUE_LENGTH-1

Tri_dvrg_persis(tri) = ( tri_sum >= TRI_DVRG_PERSIS_THRESH)

ENDFOR (tri)

FOR each triangle (tri = 1, NUM_TRI)
        tri_sum = SUM: Tri_cvrg_alarm_que(tri,[I-k])
            where the summations are over all k
                                    from k=0 to CVRG_QUE_LENGTH-1

Tri_cvrg_persis(tri) = ( tri_sum >= TRI_DVRG_PERSIS_THRESH)

ENDFOR (tri)

where [I-k] denotes the pointer position in the queue,
                backwards from I, modulo PERSIS_QUE_LENGTH

END  (DIVERGENCE_PERSISTENCE)
```

MB_LOSS

Loss estimates based on a microburst model for each edge and triangle with persistent divergence.

Parameters

```
    NUM_STATION
    NUM_EDGE
    NUM_TRI
    EDGE_VERTEX(edge,j)         edge = 1, NUM_EDGE,   j = 1,2
    EDGE_LENGTH(edge)           edge = 1, NUM_EDGE
    TRI_VERTEX(tri,j)           tri = 1, NUM_TRI,     j = 1,2,3
    TRI_AREA(tri)               tri = 1, NUM_TRI
    X1(tri), Y1(tri),
    X2(tri), Y2(tri)            tri = 1, NUM_TRI
    EDGE_EFF_LENGTH(edge)       edge = 1, NUM_EDGE
    TRI_EFF_LENGTH(tri)         tri = 1, NUM_TRI
```

```
Input
    U(stat), V(stat)              stat = 1, NUM_STATION
                          *** Wind field filtered by filter mode = 3 ***
    Edge_dvrg_persis(edge)        edge = 1, NUM_EDGE        (logical)
    Tri_dvrg_persis(tri)          tri  = 1, NUM_TRI         (logical)

Output
    Edge_divergence(edge)         edge = 1, NUM_EDGE
    Tri_divergence(tri)           tri  = 1, NUM_TRI
    Edge_loss(edge)               edge = 1, NUM_EDGE
    Tri_loss(tri)                 tri  = 1, NUM_TRI Computation FOR each edge  (edge = 1,NUM_EDGE)

IF ( Edge_dvrg_persis(edge) )

delta_u = U( EDGE_VERTEX(edge,2) ) - U( EDGE_VERTEX(edge,1)
      delta_v = V( EDGE_VERTEX(edge,2) ) - V( EDGE_VERTEX(edge,1)

Edge_divergence(edge) =
           -( delta_u * dir_x + delta_v * dir_y ) / EDGE_LENGTH(edge)
      Edge_loss(edge) = EDGE_EFF_LENGTH(edge) * Edge_divergence(edge)

ELSE

Edge_divergence(edge) = 0
      Edge_loss(edge) = 0

ENDIF

ENDFOR   (edge)

FOR each triangle (tri = 1,NUM_TRI)

IF ( Tri_dvrg_persis(tri) )

u1 = U( EDGE_VERTEX(tri,2) ) - U( EDGE_VERTEX(tri,1)
      v1 = V( EDGE_VERTEX(tri,2) ) - V( EDGE_VERTEX(tri,1)

u2 = U( EDGE_VERTEX(tri,3) ) - U( EDGE_VERTEX(tri,1)
      v2 = V( EDGE_VERTEX(tri,3) ) - V( EDGE_VERTEX(tri,1)

u_x = ( Y1(tri) * u2 - Y2(tri) * u1 ) / ( 2 * TRI_AREA(tri) )
      v_y = ( v1 * X2(tri) - v2 * X1(tri) ) / ( 2 * TRI_AREA(tri) )

Tri_divergence(tri) = u_x + v_y
      Tri_loss(tri) = TRI_EFF_LENGTH(tri) * Tri_divergence(tri)

ELSE

Tri_divergence(tri) = 0
      Tri_loss(tri) = 0

ENDIF

ENDFOR   (tri)

END  (MB_LOSS)
```

RUNWAY_ORIENTED_LOSS_AND_GAIN

Compute the loss and gain along each runway based on vector comparison.

Parameters

```
    NUM_STATION
    NUM_RWY
    DIR_X(rwy), DIR_Y(rwy)                  rwy = 1, NUM_RWY
    LOC_FACTOR
    WS_THRESH
    RWY_LOC_FLAG
    RWY_STAT_LOC(stat)                      stat = 1, NUM_STATION
    NUM_PAIR(rwy)                           rwy = 1, NUM_RWY
    I1(pair,rwy), I2(pair,rwy)              rwy= 1, NUM_RWY
                                            pair= 1, NUM_PAIR(rwy)
    DIST(pair,rwy)                          rwy= 1, NUM_RWY
                                            pair= 1, NUM_PAIR(rwy)

Input

U(stat), V(stat), Station_Active(stat)     stat = 1, NUM_STATION
                    *** Wind field filtered by filter mode = 4 ***

Output

Arrival_gain_loc(rwy), Departure_gain_loc(rwy),
    Arrival_loss_loc(rwy), Departure_loss_loc(rwy),
    Rwy_gain(rwy), Rwy_loss(rwy)                  rwy = 1, NUM_RWY Computation FOR each arrival runway  (rwy = 1,NUM_RWY)
  FOR each station pair (pair = 1,NUM_PAIR(rwy))

IF ( Station_Active(I1(pair,rwy)) and Station_Active(I2(pair,rwy)) )
       pair_gain(pair,rwy) = (U(I2(pair,rwy)) - U(I1(pair,rwy)))*DIR_X
                          + (V(I2(pair,rwy)) - V(I1(pair,rwy)))*DIR_Y pair_shear(pair) = pair_gain(pair) / DIST(pair)

ELSE pair_gain(pair)  = 0
       pair_shear(pair) = 0

ENDIF
  ENDFOR   (pair)

Rwy_gain(rwy) = max{ 0, pair_gain(pair) : pair = 1, NUM_PAIR(rwy) }
Rwy_loss(rwy) = max{ 0, -pair_gain(pair) : pair = 1, NUM_PAIR(rwy) } gain_shear(rwy) = max{ 0, pair_shear(pair): pair = 1, NUM_PAIR(rwy) }
loss_shear(rwy) = min{ 0, -pair_shear(pair): pair = 1, NUM_PAIR(rwy) }

Arrival_gain_loc(rwy) =
      max{ RWY_STAT_LOC( I1(j,rwy) ), RWY_STAT_LOC( I2(j,rwy) ) : j } where j ranges over all runway pairs such that
                pair_gain(j) >= WS_THRESH
            and
                pair_shear(j) > gain_shear(rwy) * LOC_FACTOR = RWY_LOC_FLAG  if there are no such pairs Departure_gain_loc(rwy) =
      min{ RWY_STAT_LOC( I1(j,rwy) ), RWY_STAT_LOC( I2(j,rwy) ) : j } where j ranges over all runway pairs such that
                pair_gain(j) >= WS_THRESH
            and
                pair_shear(j) > gain_shear(rwy) * LOC_FACTOR = RWY_LOC_FLAG  if there are no such pairs
```

```
Arrival_loss_loc(rwy) =
    max{ RWY_STAT_LOC( I1(j,rwy) ), RWY_STAT_LOC( I2(j,rwy) ) : j } where j ranges over all runway pairs such that
            -pair_gain(j) >= WS_THRESH
        and
            -pair_shear(j) > loss_shear(rwy) * LOC_FACTOR = RWY_LOC_FLAG  if there are no such pairs Departure_loss_loc(rwy) =
    min{ RWY_STAT_LOC( I1(j,rwy) ), RWY_STAT_LOC( I2(j,rwy) ) : j } where j ranges over all runway pairs such that
            -pair_gain(j) >= WS_THRESH
        and
            -pair_shear(j) > loss_shear(rwy) * LOC_FACTOR = RWY_LOC_FLAG  if there are no such pairs

ENDFOR  (NUM_RWY)

END  (RUNWAY_ORIENTED_LOSS_AND_GAIN)

LOSS_AND_GAIN_PERSISTENCE

Maintain loss and gain alarm queues and test for persistent alarm level
values for loss and gain on a runway basis.

Parameters
    PERSIS_QUE_LENGTH
    LOSS_QUE_LENGTH
    GAIN_QUE_LENGTH
    LOSS_PERSIS_THRESH
    GAIN_PERSIS_THRESH
    WS_THRESH
    NUM_RWY Initialization
    Initialize alarm queues to zero.

Input
    Rwy_gain(rwy)           rwy=1,NUM_RWY
    Rwy_loss(rwy)           rwy=1,NUM_RWY Output
    Gain_persis(rwy)        rwy=1,NUM_RWY       (logical)
    Loss_persis(rwy)        rwy=1,NUM_RWY       (logical)

Save for next call
    All persistence queues.

Computation
    A. Update Queues
        i.  Increment Queue Pointer I (modulo PERSIS_QUE_LENGTH)

ii. Enter the Loss Alarm Flag
            FOR each arrival runway    (rwy = 1,NUM_RWY)
                IF ( Rwy_loss(rwy) >= WS_THRESH )
                    Loss_persis_que(I,rwy) = 1
                ELSE
                    Loss_persis_que(I,rwy) = 0
            ENDFOR (rwy)

iv. Enter the Gain Alarm Flag
            FOR each arrival runway    (rwy = 1,NUM_RWY)
                IF ( Rwy_gain(rwy) >= WS_THRESH )
                    Gain_persis_que(I,rwy) = 1
                ELSE
```

```
            Gain_persis_que(I,rwy) = 0
    ENDFOR (rwy)
```

B. Determine Persistence
```
    FOR each arrival runway     (rwy = 1,NUM_RWY)
        rwy_sum = SUM: Loss_persis_que(rwy,[I-k])
            where the summations are over all k
                                        from 0 to LOSS_QUE_LENGTH-1
        Loss_persis(rwy) = ( rwy_sum >= LOSS_PERISIS_THRESH)
    ENDFOR (rwy)

FOR each arrival runway     (rwy = 1,NUM_RWY)
        rwy_sum = SUM: Gain_persis_que(rwy,[I-k])
            where the summations are over all k
                                        from 0 to GAIN_QUE_LENGTH-1
        Gain_persis(rwy) = ( rwy_sum >= GAIN_PERISIS_THRESH)
    ENDFOR (rwy)

where [I-k] denotes the pointer position in the queue,
            backwards from I, modulo PERSIS_QUE_LENGTH
```

END   (LOSS_AND_GAIN_PERSISTENCE)

DVRG_ALARM_TEST

Computes whether or not there is a divergence associated with a given runway.

Parameters

```
    NUM_EDGE
    NUM_TRI
    NUM_RWY
    ARR_EDGE_LOC(edge,rwy), DEP_EDGE_LOC(edge,rwy)
                            edge = 1, NUM_EDGE,   rwy = 1, NUM_RWY
    ARR_TRI_LOC(tri,rwy), DEP_TRI_LOC(tri,rwy)
                            tri = 1, NUM_TRI,   rwy = 1, NUM_RWY
    RWY_LOC_FLAG
    WS_THRESH
```

Input

```
    Edge_loss(edge)             edge = 1, NUM_EDGE
    Tri_loss(tri)               tri = 1, NUM_TRI
```

Output

```
    Rwy_MB_loss(rwy), Arrival_MB_loc(rwy), Departure_MB_loc(rwy),
    Rwy_dvrg(rwy)               rwy = 1, NUM_RWY    (logical)
```

Computation

```
FOR each arrival runway  (rwy = 1, NUM_RWY)

Arrival_MB_loc(rwy) = max{ ARR_EDGE_LOC(edge,rwy),
                               ARR_TRI_LOC(tri,rwy):  edge, tri }

Departure_MB_loc(rwy) = min{ DEP_EDGE_LOC(edge,rwy),
                                 DEP_TRI_LOC(tri,rwy):  edge, tri }

Rwy_MB_loss(rwy) = max{ Edge_loss(edge),
                            Tri_loss(tri):  edge, tri } where edge and tri range over all indices that satisfy edge:   ARR_EDGE_LOC(edge,rwy) != RWY_LOC_FLAG
            and Edge_loss(edge) >= WS_THRESH
```

```
        tri:    ARR_TRI_LOC(tri,rwy) != RWY_LOC_FLAG
            and Tri_loss(tri) >= WS_THRESH
```

If there are no such indices (edge or tri), then

```
        Arrival_MB_loc(rwy)   = RWY_LOC_FLAG
        Departure_MB_los(rwy) = RWY_LOC_FLAG
        Rwy_MB_loss(rwy)      = 0

IF( Rwy_MB_loss(rwy) > 0 )

Rwy_dvrg(rwy) = true

ENDIF

ENDFOR (rwy)

END (DVRG_ALARM_TEST)
```

CVRG_ALARM_TEST

Computes whether or not there is convergence associated with the given runway.

Parameters

```
    NUM_TRI
    NUM_EDGE
    NUM_RWY
    ARR_TRI_LOC(tri,rwy), DEP_TRI_LOC(tri,rwy)
                        tri = 1, NUM_TRI,   rwy = 1, NUM_RWY
    ARR_EDGE_LOC(edge,rwy), DEP_EDGE_LOC(edge,rwy)
                        edge = 1, NUM_EDGE, rwy = 1, NUM_RWY
    RWY_LOC_FLAG
    WS_THRESH
```

Input

```
    Tri_cvrg_persis(tri)        tri = 1, NUM_TRI        (logical)
    Edge_cvrg_persis(edge)      edge = 1, NUM_EDGE      (logical)
```

Output

```
    Rwy_cvrg(rwy)               rwy = 1, NUM_RWY        (logical)
```

Computation

```
FOR each arrival runway (rwy = 1, NUM_RWY)

IF ( there is any triangle (tri = 1, NUM_EDGE) for which
        (a) Tri_cvrg_persis(tri) is True   and
        (b) ARR_TRI_LOC(tri,rwy) != RWY_LOC_FLAG   and
        (c) DEP_TRI_LOC(tri,rwy) != RWY_LOC_FLAG   )

Rwy_Cvrg(rwy) = true

ELSEIF ( there is any edge (edge = 1, NUM_EDGE) for which
        (a) Edge_cvrg_persis(edge) is true   and
        (b) ARR_EDGE_LOC(edge,rwy) != RWY_LOC_FLAG   and
        (b) DEP_EDGE_LOC(edge,rwy) != RWY_LOC_FLAG   )

Rwy_cvrg(rwy) = true

ELSE

Rwy_cvrg(rwy) = false

ENDIF
```

```
ENDFOR  (rwy)

END  (CVRG_ALARM_TEST)

WS_LOSS_TEST

Test for wind shear with loss alarm on runway.

Parameters

NUM_EDGE
     WS_THRESH

Input

Arrival_loss_loc(rwy), Departure_loss_loc(rwy), Rwy_loss(rwy)
                                             rwy = 1, NUM_RWY
     Loss_persis(rwy), Rwy_Dvrg(rwy)         rwy = 1, NUM_RWY    (logical)

Output

Arrival_loss_loc(rwy), Departure_loss_loc(rwy), Rwy_Loss(rwy)
                                             rwy = 1, NUM_RWY Computation FOR each arrival runway  (rwy = 1, NUM_RWY)

IF( Loss_persis(rwy) and  Rwy_loss(rwy)  < WS_THRESH  )

Rwy_loss(rwy) = WS_THRESH
         Arrival_loss_loc(rwy) = Last_arr_loss_loc(rwy)
         Departure_loss_loc(rwy) = Last_dep_loss_loc(rwy)

ELSE
         IF( (Rwy_loss(rwy) < WS_THRESH)  or
                    (not Rwy_Dvrg(rwy)  and  not Loss_persis(rwy)) )

Rwy_loss(rwy) = 0
                             *** set loss so no alarm will issue ***

ENDIF

*** all other cases will issue alarms subject
         *** to alarm arbitration

ENDIF

Last_arr_loss_loc(rwy) = Arrival_loss_loc(rwy)
     Last_dep_loss_loc(rwy) = Departure_loss_loc(rwy)

ENDFOR  (rwy)

END  (WS_LOSS_TEST)

WS_GAIN_TEST

Test for wind shear with gain alarm on runway.

Parameters

NUM_EDGE
     WS_THRESH

Input

Arrival_gain_loc(rwy), Departure_gain_loc(rwy), Rwy_gain(rwy)
                                             rwy = 1, NUM_RWY
     Gain_persis(rwy), Rwy_cvrg(rwy)         rwy = 1, NUM_RWY    (logical)
```

Output

Arrival_gain_loc(rwy), Departure_gain_loc(rwy), Rwy_gain(rwy)
                                               rwy = 1, NUM_RWY Computation FOR each arrival runway  (rwy = 1, NUM_RWY)

IF( Gain_persis(rwy)  and  Rwy_gain(rwy) < WS_THRESH )

Rwy_gain(rwy) = WS_THRESH
        Arrival_gain_loc(rwy) = Last_arr_gain_loc(rwy)
        Departure_gain_loc(rwy) = Last_dep_gain_loc(rwy)

ELSE
        IF( (Rwy_gain(rwy) < WS_THRESH)  or
            (not Rwy_cvrg(rwy) and  not Gain_persis(rwy)) )

Rwy_gain(rwy) = 0
                * set gain so no alarm will issue *

ENDIF

*** all other cases will issue alarms
        *** subject to alarm arbitration

ENDIF

Last_arr_gain_loc(rwy) = Arrival_gain_loc(rwy)
    Last_dep_gain_loc(rwy) = Departure_gain_loc(rwy)

ENDFOR  (rwy)

END  (WS_GAIN_TEST)

RUNWAY_ALARM_ARBITRATION

Arbitrate multiple alarm conditions to determine a single alarm message for each runway.

Parameters

NUM_RWY
    WS_THRESH
    MB_THRESH
    LOSS_INCREMENT
    LOSS_GAIN_BUFFER

Initialization  ( before algorithm start or restart )

Last_loss(rwy) = false, Last_gain(rwy) = false        (logical)

Input

Arrival_MB_loc(rwy), Departure_MB_loc(rwy), Rwy_MB_loss(rwy),
    Arrival_loss_loc(rwy), Departure_loss_loc(rwy), Rwy_loss(rwy),
    Arrival_gain_loc(rwy), Departure_gain_loc(rwy), Rwy_gain(rwy),
                                          rwy = 1, NUM_RWY Output Message(rwy,1), Message(rwy,2)        rwy = 1, NUM_RWY Save for next call Last_loss(rwy), Last_gain(rwy)        rwy = 1, NUM_RWY    (logical)

Computation

```
FOR each arrival runway  (rwy = 1,NUM_RWY)

IF( Rwy_MB_loss(rwy) >= MB_THRESH )

loss     = - Rwy_MB_loss(rwy)
        location = Arrival_MB_loc(rwy)
        Message(rwy,1) = 'MBA',loss,location
        location = Departure_MB_loc(rwy)
        Message(rwy,2) = 'MBA',loss,location ELSEIF( Rwy_loss(rwy) >= WS_THRESH or Rwy_gain(rwy) >= WS_THRESH )

loss = Rwy_loss(rwy)
        gain = Rwy_gain(rwy)

IF (Rwy_loss(rwy) >= WS_THRESH and Rwy_gain(rwy) >= WS_THRESH)

ROL = false                                    (logical)

IF ( Last_gain(rwy) )

IF ( (loss + LOSS_INCREMENT - LOSS_GAIN_BUFFER)
                                                        > gain )
                ROL = true
            ENDIF ELSEIF ( Last_loss(rwy) )

IF ( (loss + LOSS_INCREMENT + LOSS_GAIN_BUFFER)
                                                        > gain )
                ROL = true
            ENDIF ELSE
            IF ( (loss + LOSS_INCREMENT) >= gain )
                ROL = true
            ENDIF
        ENDIF ELSEIF ( Rwy_loss(rwy) >= WS_THRESH )
        ROL = true
    ENDIF IF ( ROL )
        loss     = - Rwy_loss(rwy)
        location = Arrival_loss_loc(rwy)
        Message(rwy,1) = 'WSA',loss,location
        location = Departure_loss_loc(rwy)

IF ( location < 3 )
            Message(rwy,2) = 'WSA',loss,location
        ELSE
            Message(rwy,2) = 'NULL',0,0
        ENDIF Last_loss = true
        Last_gain = false ELSE
        gain     = Rwy_gain(rwy)
        location = Arrival_gain_loc(rwy)
        Message(rwy,1) = 'WSA',gain,location
        location = Departure_gain_loc(rwy)

IF ( location < 3 )
            Message(rwy,2) = 'WSA',gain,location
            ELSE
                Message(rwy,2) = 'NULL',0,0
```

```
                    ENDIF

Message(rwy,2) = 'WSA',gain,location
                Last_gain = true
                Last_loss = false

ENDIF

ELSE
        Message(rwy,1) = 'NULL',0,0
        Message(rwy,2) = 'NULL',0,0
        Last_gain = false
        Last_loss = false
    ENDIF ENDFOR (rwy)

END   (RUNWAY_ALARM_ARBITRATION)

POSSIBLE_WIND_SHEAR_OUTSIDE_MESSAGE

Determine if the 'Possible wind shear outside' message is needed.

Parameters

NUM_RWY
    NUM_STATION
    RWY_STAT_LOC(stat,rwy)        stat = 1, NUM_STAT
                                   rwy = 1, NUM_RWY
    RWY_LOC_FLAG
    DIR_X(rwy), DIR_Y(rwy)        rwy = 1, NUM_RWY Input U(stat), V(stat)              stat = 1, NUM_STATION
                    * Wind field filtered by filter mode = 4 *
    U_bar, V_bar
    Message(rwy,i)                i = 1,2    Rwy = 1, NUM_RWY
    Station_active(stat)          stat = 1, NUM_STATION Output Poss_ws_outside(rwy)          rwy = 1, NUM_RWY          (logical)

Computation

FOR each arrival runway  (rwy = 1, NUM_RWY)

Max_location = Max( RWY_STAT_LOC(stat,rwy) )
                   maximum over active stations with
                   RWY_STAT_LOC(stat,rwy) != RWY_LOC_FLAG IF ( (a) Max_location < 3                                and
         (b) Message(rwy,1) = 'WSA', gain, location          and
         (c) Location = Max_location                         and
         (d) (U(stat) - U_bar) * DIR_X(rwy)
                          + (V(stat) - V_bar) * DIR_Y(rwy) > 0 for some active station with RWY_STAT_LOC(stat,rwy) = Max_locatio

Poss_ws_outside(rwy) = true

ELSE

Poss_ws_outside(rwy) = false

ENDIF

ENDFOR    (rwy)

END   (POSSIBLE_WIND_SHEAR_OUTSIDE)
```

APPENDIX II

PARAMETERS ( Airport Configuration File -- ACF)

| | | |
|---|---|---|
| ARR_EDGE_LOC(edge,rwy) | - Edge location for arrival runway<br>edge = 1, NUM_EDGE<br>rwy = 1, NUM_RWY | (integer) |
| ARR_TRI_LOC(tri,rwy) | - Triangle location for arrival runway<br>edge = 1, NUM_EDGE<br>rwy = 1, NUM_RWY | (integer) |
| CVRG_QUE_LENGTH | - Length of Convergence persistence queue | (integer) |
| DEP_EDGE_LOC(edge,rwy) | - Edge location for departure runway<br>edge = 1, NUM_EDGE<br>rwy = 1, NUM_RWY | (integer) |
| DEP_TRI_LOC(tri,rwy) | - Triangle location for departure runway<br>edge = 1, NUM_EDGE<br>rwy = 1, NUM_RWY | (integer) |
| DIR_X(rwy), DIR_Y(rwy) | - Runway Direction Vector<br>rwy = 1, NUM_RWY | (Km) |
| DIST(pair,rwy) | - Along runway distance between pair of stations<br>pair = 1, NUM_PAIR(rwy)<br>rwy = 1, NUM_RWY | (Km) |
| DVRG_QUE_LENGTH | - Length of Divergence persistence queue | (integer) |
| EDGE_CVRG_PERSIS_THRESH | - Persistence Threshold for edge convergence | (integer) |
| EDGE_CVRG_THRESHOLD(edge) | - Edge Convergence Threshold<br>edge=1, NUM_EDGE | (.001/s) |
| EDGE_DIR_X(edge), EDGE_DIR_Y(edge) | - Edge direction vector<br>edge = 1, NUM_EDGE | (Km) |
| EDGE_DVRG_PERSIS_THRESH | - Persistence threshold for edge divergence | (integer) |
| EDGE_DVRG_THRESHOLD(edge) | - Edge Divergence Threshold<br>edge=1, NUM_EDGE | |
| EDGE_EFF_LENGTH(edge) | - Edge effective length<br>edge = 1, NUM_EDGE | (Km) |
| EDGE_FACTOR(edge) | - Edge noise adjustment factor<br>edge = 1, NUM_EDGE | |
| EDGE_LENGTH(edge) | - Edge length<br>edge = 1, NUM_EDGE | (Km) |
| EDGE_VERTEX(edge,j) | - Edge vertex station indices<br>edge = 1, NUM_EDGE,  j = 1,2 | (integer) |
| FILTER_LEN(mode) | - Filter queue length for each mode<br>mode = 1, NUM_FILTER | (integer) |
| FLAG | - Missing data flag | (m/s) |
| GAIN_PERSIS_THRESH | - Persistence threshold for runway gain | (integer) |
| GAIN_QUE_LENGTH | - Length of Gain persistence queue | (integer) |
| I1(pair,rwy), I2(pair,rwy) | - Station indices for Loss/Gain computation<br>pair = 1, NUM_PAIR(rwy)<br>rwy = 1, NUM_RWY | (integer) |
| LOC_FACTOR | - Tolerance for Loss/Gain location | (unitless) |
| LONG_GAP | - Unacceptable data gap | (polls, integer) |
| LOSS_QUE_LENGTH | - Length of Loss persistence queue | (integer) |
| LOSS_GAIN_BUFFER | - Buffer on LOSS_INCREMENT | (m/s) |

| | |
|---|---|
| LOSS_INCREMENT | – Increment for Gain to exceed Loss (m/s) |
| LOSS_PERSIS_THRESH | – Persistence threshold for runway loss (integer) |
| MB_THRESH | – Microburst alarm threshold (m/s) |
| MEAN_FILTER | – Filter constant for single pole filter used for the network mean (unitless) |
| NUM_FILTER | – Number of filter modes (integer) |
| NUM_EDGE | – Number of edges (integer) |
| NUM_PAIR(rwy) | – Number of Loss/Gain pairs on a runway (integer) rwy = 1, NUM_RWY |
| NUM_RWY | – Number of arrival runways (integer) |
| NUM_STATION | – Number of stations (integer) |
| NUM_TRI | – Number of triangles (integer) |
| PERSIS_QUE_LENGTH | – Maximum length of persistence queue ( = 15 ) (integer) |
| QUEUE_LENGTH | – Maximum length of filter queue ( = 15 ) (integer) |
| RUNWAY_LAT(rwy) | – Runway Latitude (deg,min,sec) rwy = 1, NUM_RWY |
| RUNWAY_LON(rwy) | – Runway Longitude (deg,min,sec) rwy = 1, NUM_RWY |
| RUNWAY_X(rwy) | – Runway x coordinate (Km) rwy = 1, NUM_RWY |
| RUNWAY_Y(rwy) | – Runway y coordinate (Km) rwy = 1, NUM_RWY |
| RWY_LOC_FLAG | – Flag to indicate station, edge, or triangle not associated with runway (integer) |
| RWY_STAT_LOC(stat,rwy) | – Location of station stat = 1, NUM_STATION rwy = 1, NUM_RWY |
| SD_FILTER | – Filter constant for single pole filter used for the network standard deviation (unitless) |
| SHELTERED_WEDGE_LOW(stat) | – Starting angle for a wedge of sheltered winds (degrees) stat=1, NUM_STATION |
| SHELTERED_WEDGE_HIGH(stat) | – Ending angle for a wedge of sheltered winds (degrees) stat=1, NUM_STATION |
| SHORT_GAP | – Acceptable data gap (integer) |
| SIGMA_MIN | – Minimum value for network wind field standard deviation (m/s) |
| STATION_ACTIVE_LIMIT | – Minimum number of polls required before station is active for alarms (integer) |
| STATION_LAT(stat) | – Station Latitude (deg,min,sec) stat = 1, NUM_STATION |
| STATION_LON(stat) | – Station Longitude (deg,min,sec) stat = 1, NUM_STATION |
| STATION_X(stat) | – Station x coordinate (Km) stat = 1, NUM_STATION |
| STATION_Y(stat) | – Station y coordinate (Km) stat = 1, NUM_STATION |
| TRI_AREA(tri) | – Triangle Area (Km**2) tri = 1, NUM_TRI |
| TRI_CVRG_PERSIS_THRESH | – Persistence threshold for triangle convergence (integer) |
| TRI_CVRG_THRESHOLD(tri) | – Triangle Convergence Threshold (.001/s) tri=1, NUM_TRI |
| TRI_DVRG_PERSIS_THRESH | – Persistence threshold for triangle divergence (integer) |
| TRI_DVRG_THRESHOLD(tri) | – Triangle Divergence Threshold (.001/s) tri=1, NUM_TRI |

| | |
|---|---|
| TRI_EFF_LENGTH(tri) | - Triangle Effective Length (Km)<br>tri = 1, NUM_TRI |
| TRI_FACTOR(tri) | - Triangle noise adjustment factor<br>tri = 1, NUM_TRI |
| TRI_VERTEX(tri,j) | - Triangle vertex<br>station indices (integer)<br>tri = 1, NUM_TRI, j = 1,2,3 |
| TRIM_NUM | - Initialization trim number<br>(integer) |
| TRIM_THRESH | - Trim threshold (Chi-sq'd)<br>(unitless) |
| W(k,mode) | - Filter Weights (unitless)<br>k = 1, FILTER_LEN(j)<br>mode = 1, NUM_FILTER |
| WS_THRESH | - Wind Shear alarm threshold (m/s) |
| X1(tri), Y1(tri),<br>X2(tri), Y2(tri) | - Triangle side vectors (Km)<br>tri = 1, NUM_TRI |

END     (PARAMETERS)

APPENDIX III

GENERATION OF THE AIRPORT CONFIGURATION FILE

Constants

A variety of constants is used to control the operation of the algorithm. They include flag values, tolerances, and count limits.

```
FLAG                  = -99.
LOC_FACTOR            = .9
LONG_GAP              = 5
LOSS_GAIN_BUFFER      = 2.
LOSS_INCREMENT        = 5.
RWY_LOC_FLAG          = -99
SHORT_GAP             = 3
SIGMA_MIN             = 2.
STATION_ACTIVE_LIMIT  = 5
TRIM_NUM              = 2
TRIM_THRESH           = 10.
```

Filter Constants

There are several levels of filtering in the algorithm. The wind field data are filtered by weighted running means and the network mean and standard deviation are filtered by single pole recursive filters. The lengths of these filters and the filter constants are taylored to the length of the polling cycle and desired algorithm performance.

```
FILTER_LEN(mode)    = 5, 5, 5, 5
MEAN_FILTER         = .8
NUM_FILTER          = 4
QUEUE_LENGTH        = 15
SD_FILTER           = .99
W(k,mode)           = .2,.2,.2,.2,.2    (mode = 1)
                    = .2,.2,.2,.2,.2    (mode = 2)
                    = .2,.2,.2,.2,.2    (mode = 3)
                    = .2,.2,.2,.2,.2    (mode = 4)
```

The edge noise adjustment factor is computed for each edge as follows:

EDGE_FACTOR(edge) = 4.25 / L where L is the length of the edge.

The triangle noise adjustment factor is computed for each triangle as follows:

TRI_FACTOR(tri) = 4.25 * SQRT( L1*L1 + L2*L2 + L1*L2*C ) / (L1*L2*S)
  where

L1 is the longest side of the triangle
       L2 is the second longest side
       C and S are the cosine and sine of the smallest angle, resectively Network Geometry The network consists of stations, edges, and triangles.

Stations are described by their latitudes and longitudes and by their cartesian coordinates in the airport coordinate system (this information is not used by the algorithm, but is included for completeness).

STATION_LAT(stat), STATION_LON(stat),
        STATION_X(stat), STATION_Y(stat)
                            stat = 1, NUM_STATION An edge is formed by each pair of stations that has distance between 1.5 and 5.5 Km. Edges are described by:

Vertex station numbers:  EDGE_VERTEX(edge,j)   j = 1,2
       Unit direction vectors:  EDGE_DIR_X(edge), EDGE_DIR_Y(edge)
             (directed from vertex 1 to vertex 2)
       Length:                       EDGE_LENGTH(edge)

A triangle is formed by any triple of stations that satisfies:
    i) Each pair of stations is a edge
    ii) The minimum angle of the triangle is greater than 25 degrees
Triangles are described by:

Vertex station numbers in clockwise order:
            TRI_VERTEX(tri,j)         j = 1,2,3
       Triangle side vectors:   X1(tri), Y1(tri),
                                X2(tri), Y2(tri)
               (directed from vertex 1 to vertex 2 and
                  from vertex 1 to vertex 3, respectively)
       Area:                         TRI_AREA(tri)

Persistence and alarm thresholds

These thresholds are used to determine if the divergence value on an edge or triangle or the loss or gain value on a runway is large enough and persists for a sufficient number of polls to indicate that a hazardous wind shear is present.

```
CVRG_QUE_LENGTH            = 6
DVRG_QUE_LENGTH            = 6
EDGE_CVRG_PERSIS_THRESH    = 4
EDGE_DVRG_PERSIS_THRESH    = 4
GAIN_QUE_LENGTH            = 7
LOSS_QUE_LENGTH            = 7
GAIN_PERSIS_THRESH         = 5
LOSS_PERSIS_THRESH         = 5
MB_THRESH                  = 15.0
PERSIS_QUE_LENGTH          = 15
TRI_CVRG_PERSIS_THRESH     = 4
TRI_DVRG_PERSIS_THRESH     = 4
WS_THRESH                  = 7.5

EDGE_CVRG_THRESHOLD(edge)   = 2 * EDGE_FACTOR(edge)

EDGE_DVRG_THRESHOLD(edge)   = 2 * EDGE_FACTOR(edge)
```

TRI_CVRG_THRESHOLD(tri) = 2 * TRI_FACTOR(tri)

TRI_DVRG_THRESHOLD(tri) = 2 * TRI_FACTOR(tri)

Effective lengths

These factors are used to convert divergence estimates from triangles
and edges into loss estimates when there is evidence that a microburst
is present.

If L is the length of the edge, then the edge effective length is
computed as follows:

$$\text{EDGE\_EFF\_LENGTH(edge)} = \begin{cases} 1.28\ L & \text{if } L < 2.5 \\ (1.98-.281)\ L & \text{if } 2.5 < L < 3.5 \\ L & \text{if } 3.5 < L \end{cases}$$

If a triangle has longest side L1, next longest side L2, and smallest
angle T (degrees), then the triangle effective length is computed as
follows:

b = ( -4.27*L1 - .95*L2 - 6.83*T - .065*L2*T ) / L1
c = 27.67 + .043*T
d = -c/(2*b)
f = 30/c $$\text{TRI\_EFF\_LENGTH(tri)} = \begin{cases} L1 * f / d & \text{if } L1 < 3.5 \\ 3.5 * f / d & \text{if } 3.5 < L1 \end{cases}$$

Runway loss/gain station pair

The lists of pairs of stations that are used to estimate runway
oriented loss and gain for each runway. For each such pair, the
station vertices and the along runway distance between the stations is
listed (Km).

I1(pair,rwy), I2(pair,rwy)  To qualify as a pair, both stations
    must be within 1 Km lateral distance from the runway and the
    along runway distance between teh stations must be between
    1 and 5 Km. The ordering I1, I2 is chosen so that I2 is
    beyond I1, according to the runway direction vector.
DIST(pair,rwy)   Along runway distance between stations of a pair
NUM_PAIR(rwy)    Number of pairs for each runway Station sheltering sectors The wedge of directions from which sheltering renders the station wind
estimates to be unreliable. A wedge is provided for each station. It
consists of the initial angle and the final angle, in degrees and
measured counterclockwise from magnetic north. If there is no
sheltering, then the wedge is described as 0, 0.

| | |
|---|---|
| SHELTERED_WEDGE_LOW(stat) | - Starting angle for a wedge of sheltered winds (degrees) stat=1, NUM_STATION |
| SHELTERED_WEDGE_HIGH(stat) | - Ending angle for a wedge of sheltered winds (degrees) stat=1, NUM_STATION |

Runway geometry

Each arrival runway is represented by its unit direction vector (in
the arrival direction).

| | |
|---|---|
| DIR_X(rwy), DIR_Y(rwy) | - Runway Direction Vector (Km) (arrival direction) |
| NUM_RWY | - Number of arrival runways (integer) |

In addition, runways are described by their latitudes and longitudes and by their cartesian coordinates in the airport coordinate system (this information is not used by the algorithm, but is included for completeness).

| | |
|---|---|
| RUNWAY_LAT(rwy) | — Runway Latitude |
| RUNWAY_LON(rwy) | — Runway Longitude |
| RUNWAY_X(rwy) | — Runway x coordinate |
| RUNWAY_Y(rwy) | — Runway y coordinate |

Runway alarm location pointers

Each station, edge, and triangle is associated with two positions along each arrival runway, the arrival location and the departure location (for the oppositely directed runway). The location pointers have values 0, 1, 2, 3, or RWY_LOC_FLAG. 0 indicates 'on the runway', 1, 2, or 3 indicates the distance from the runway threshold in nautical miles, and RWY_LOC_FLAG indicates that the element is not associated with this runway.

| | |
|---|---|
| RWY_STAT_LOC(stat,rwy) | = RWY_LOC_FLAG if lateral distance from runway exceeds 1 Km. |
| (else) | = 0, 1, 2, 3 depending on distance between the runway threshold and the projection of the station to the runway centerline |
| ARR_EDGE_LOC(edge,rwy) | = RWY_LOC_FLAG if lateral distance of both vertex stations to runway exceeds 1 Km. |
| (else) | = maximum of the RWY_STAT_LOC's for vertex stations with lateral distance to the runway of less than 1 Km. |
| ARR_TRI_LOC(tri,rwy) | = RWY_LOC_FLAG if lateral distance of all vertex stations to runway exceeds 1 Km |
| (else) | = maximum of the RWY_STAT_LOC's for vertex stations with lateral distance to the runway of less than 1 Km. |
| DEP_EDGE_LOC(edge,rwy) | = RWY_LOC_FLAG if lateral distance of both vertex stations to runway exceeds 1 Km. |
| (else) | = minimum of the RWY_STAT_LOC's for vertex stations with lateral distance to the runway of less than 1 Km. |
| DEP_TRI_LOC(tri,rwy) | = RWY_LOC_FLAG if lateral distance of all vertex stations to runway exceeds 1 Km |
| (else) | = minimum of the RWY_STAT_LOC's for vertex stations with lateral distance to the runway of less than 1 Km. |

What is claimed is:

1. A method of identifying the presence and locus of wind shear in a predefined area based on wind measurements from a plurality of wind sensors, each of which plurality of wind sensors is located in said predefined area and produces wind data indicative of wind magnitude and direction at the location of said wind sensor, comprising the steps of:
   collecting said wind data from said plurality of wind sensors to chart a wind field in said predefined area; and
   performing a divergence analysis on said charted wind field, using said collected wind data from selected pairs and triples of said wind sensors to identify the presence and locus of wind shear in said predefined area.

2. The method of claim 1:
   wherein said step of collecting includes periodically polling each of said wind sensors to collect said wind data; and
   said method further includes determining the persistence of said wind shear as a measurement of the presence of said wind shear for at least n of the last m polls, where n and m are integers of predetermined value greater than 1.

3. The method of claim 1 wherein said step of collecting includes:
   periodically polling each of said wind sensors to collect said wind data; and
   filtering said collected wind data to damp the effect of fluctuations in said data obtained from said wind sensors.

4. The method of claim 1 wherein said wind sensors are anemometers which produce data indicative of a two dimensional wind magnitude and direction, said step of performing includes:
   computing a two dimensional divergence analysis on said collected wind data.

5. Apparatus for identifying the presence and locus of wind shear in a predefined area based on wind measurements from a plurality of wind sensors, each of which plurality of wind sensors is located in said predefined area and produces wind data indicative of wind magnitude and direction at the location of said wind sensor, comprising:
- means for collecting said wind data from said plurality of wind sensors to chart a wind field in said predefined area; and
- means for performing a divergence analysis on said charted wind field, using said collected wind data from selected pairs and triples of said wind sensors to identify the presence and locus of wind shear in said predefined area.

6. The apparatus of claim 5:
- wherein said collecting means includes means for periodically polling each of said wind sensors to collect said wind data; and
- said apparatus further includes means for determining the persistence of said wind shear as a measurement of the presence of said wind shear for at least n of the last m polls, where n and m are integers of predetermined value greater than 1.

7. The apparatus of claim 5 wherein said collecting means includes:
- means for periodically polling each of said wind sensors to collect said wind data; and
- means for filtering said collected wind data to damp the effect of fluctuations in said data obtained from said wind sensors.

8. The apparatus of claim 5 wherein said wind sensors are anemometers which produce data indicative of a two dimensional wind magnitude and direction, said performing means includes:
- means for computing a two dimensional divergence analysis on said collected wind data.

9. A method of identifying the presence and locus of wind shear in a predefined area based on wind measurements from a plurality of wind sensors, each of which plurality of wind sensors is located in said predefined area and produces wind data indicative of a two dimensional wind magnitude and direction at the location of said wind sensor, comprising the steps of:
- collecting said wind data from said plurality of wind sensors, including periodically polling each of said wind sensors to collect said wind data to chart a wind field in said predefined area; and
- computing a two dimensional divergence analysis on said charted wind field, using said collected wind data from selected pairs and triples of said wind sensors to identify the presence and locus of wind shear in said predefined area; and
- determining the persistence of said wind shear as a measurement of the presence of said wind shear for at least n of the last m polls, where n and m are integers of predetermined value greater than 1.

10. The method of claim 9 wherein said performing means includes:
- calculating the magnitude and direction of said wind shear.

11. The method of claim 10 wherein said performing means further includes:
- comparing said calculated wind shear magnitude to at least two predetermined thresholds to identify one of a corresponding number of wind shear severity classifications corresponding to the threshold of greatest magnitude exceeded by said wind shear magnitude.

12. The method of claim 9 wherein said step of collecting includes:
- periodically polling each of said wind sensors to collect said wind data; and
- filtering said collected wind data to damp the effect of fluctuations in said data obtained from said wind sensors.

13. Apparatus for identifying the presence and locus of wind shear in a predefined area based on wind measurements from a plurality of wind sensors, each of which plurality of wind sensors is located in said predefined area and produces wind data indicative of a two dimensional wind magnitude and direction at the location of said wind sensor, comprising:
- means for collecting said wind data from said plurality of wind sensors, including means for periodically polling each of said wind sensors to collect said wind data to chart a wind field in said predefined area;
- means for computing a two dimensional divergence analysis on said charted wind field, using said collected wind data from selected pairs and triples of said wind sensors to identify the presence and locus of wind shear in said predefined area; and
- means for determining the persistence of said wind shear as a measurement of the presence of said wind shear for at least n of the last m polls, where n and m are integers of predetermined value greater than 1.

14. The apparatus of claim 13 wherein said performing means includes:
- means for calculating the magnitude and direction of said wind shear.

15. The apparatus of claim 14 wherein said performing means further includes:
- means for comparing said calculated wind shear magnitude to at least two predetermined thresholds to identify one of a corresponding number of wind shear severity classifications corresponding to the threshold of greatest magnitude exceeded by said wind shear magnitude.

16. The apparatus of claim 14 further including:
- means for generating a gust front alert indicative of the presence of a negative divergence in said divergence analysis.

17. The apparatus of claim 14 further including:
- means for generating a gust front alert indicative of the presence of a convergence in said divergence analysis.

18. The apparatus of claim 14 further including:
- means for generating a microburst alert indicative of the presence of a positive divergence in said divergence analysis.

19. The apparatus of claim 13 wherein said collecting means includes:
- means for periodically polling each of said wind sensors to collect said wind data; and
- means for filtering said collected wind data to damp the effect of fluctuations in said data obtained from said wind sensors.

20. A method of identifying the presence and locus of wind shear in a predefined area based on wind measurements from at least one wind sensing system which is located in said predefined area and produces wind data indicative of wind magnitude and direction, comprising the steps of:

collecting said wind data from said at least one wind sensing system to chart a wind field in said predefined area; and performing a divergence analysis on said charted wind field, using said collected wind data to identify the presence and locus of wind shear in said predefined area.

21. Apparatus for identifying the presence and locus of wind shear in a predefined area based on wind measurements from at least one wind sensing system which produces wind data indicative of wind magnitude, comprising:

means for collecting said wind data from said at least one wind sensing system to chart a wind field in said predefined area; and means for performing a divergence analysis on said charted wind field, using said collected wind data to identify the presence and locus of wind shear in said predefined area.

* * * * *